US008799157B1

(12) United States Patent
Weisman et al.

(10) Patent No.: US 8,799,157 B1
(45) Date of Patent: Aug. 5, 2014

(54) BUSINESS COMBINED BILL MANAGEMENT SYSTEM AND METHOD

(75) Inventors: Jeffrey S. Weisman, Atlanta, GA (US); Dushyant Sharma, Richmond Hill (CA); Murali Chirala, Morgan Hill, CA (US); Hans E. Myklebust, Menomonee Falls, WI (US); John L. Watry, Elm Grove, WI (US)

(73) Assignee: Metavante Corporation, Jacksonville, FL (US)

( * ) Notice: Subject to any disclaimer, the term of this patent is extended or adjusted under 35 U.S.C. 154(b) by 2161 days.

(21) Appl. No.: 10/141,244

(22) Filed: May 8, 2002

(51) Int. Cl.
*G06Q 40/00* (2012.01)
*G06Q 30/04* (2012.01)

(52) U.S. Cl.
CPC .................................... *G06Q 30/04* (2013.01)
USPC ........................................................ 705/40

(58) Field of Classification Search
CPC .................................................. G06Q 30/04
USPC ......................................... 705/26–27, 35–40
See application file for complete search history.

(56) References Cited

U.S. PATENT DOCUMENTS

| | | | |
|---|---|---|---|
| 3,833,885 | A | 9/1974 | Gentile et al. |
| 4,277,837 | A | 7/1981 | Stuckert |
| 4,315,101 | A | 2/1982 | Atalla |
| 4,317,957 | A | 3/1982 | Sendrow |
| 4,319,336 | A | 3/1982 | Anderson et al. |
| 4,420,751 | A | 12/1983 | Paganini et al. |
| 4,454,414 | A | 6/1984 | Benton |
| 4,460,960 | A | 7/1984 | Anderson et al. |
| 4,634,845 | A | 1/1987 | Hale et al. |
| 4,678,895 | A | 7/1987 | Tateisi et al. |
| 4,689,478 | A | 8/1987 | Hale et al. |
| 4,695,880 | A | 9/1987 | Johnson et al. |
| 4,727,243 | A | 2/1988 | Savar |
| 4,734,858 | A | 3/1988 | Schlafly |
| 4,799,156 | A | 1/1989 | Shavit et al. |
| 4,823,264 | A | 4/1989 | Deming |
| 4,947,028 | A | 8/1990 | Gorog |
| 5,007,084 | A | 4/1991 | Materna et al. |

(Continued)

FOREIGN PATENT DOCUMENTS

| | | |
|---|---|---|
| EP | 1020824 A2 | 7/2000 |
| EP | 1043668 A2 | 10/2000 |

(Continued)

OTHER PUBLICATIONS

Crone, American Banker vol. 165, Iss.94, May 16, 2000.*

(Continued)

*Primary Examiner* — Thomas M Hammond, III
(74) *Attorney, Agent, or Firm* — Finnegan, Henderson, Farabow, Garrett & Dunner, LLP

(57) ABSTRACT

An integrated bill management system and an associated method for use therewith are disclosed which can manage the delivery of, and handle the payments associated with, both outgoing invoices from businesses to their customers and incoming bills from vendors to the businesses. Invoices are presented to customers and payment by the customers is facilitated, and bills from the vendors are obtained and presented electronically to the businesses and paid electronically for the businesses. Invoices may be presented to the customers either electronically or in paper form, and electronic and paper payments from the customers may be processed by the system. Vendors may provide either electronic or paper bills, and payment to vendors may be processed electronically or in paper form.

19 Claims, 9 Drawing Sheets

(56) References Cited

U.S. PATENT DOCUMENTS

| | | | | |
|---|---|---|---|---|
| 5,025,373 | A | 6/1991 | Keyser, Jr. et al. | |
| 5,220,501 | A | 6/1993 | Lawlor et al. | |
| 5,231,571 | A | 7/1993 | D'Agostino | |
| 5,265,033 | A | 11/1993 | Vajk et al. | |
| 5,283,829 | A | 2/1994 | Anderson | |
| 5,287,270 | A | 2/1994 | Hardy et al. | |
| 5,325,290 | A | 6/1994 | Cauffman et al. | |
| 5,326,959 | A | 7/1994 | Perazza | |
| 5,336,870 | A | 8/1994 | Hughes et al. | |
| 5,341,429 | A | 8/1994 | Stringer et al. | |
| 5,347,632 | A | 9/1994 | Filepp et al. | |
| 5,383,113 | A | 1/1995 | Kight et al. | |
| 5,420,405 | A | 5/1995 | Chasek | |
| 5,424,938 | A | 6/1995 | Wagner et al. | |
| 5,465,206 | A * | 11/1995 | Hilt et al. | 705/40 |
| 5,473,143 | A | 12/1995 | Vak et al. | |
| 5,483,445 | A | 1/1996 | Pickering | |
| 5,579,407 | A * | 11/1996 | Murez | 382/164 |
| 5,594,910 | A | 1/1997 | Filepp et al. | |
| 5,649,117 | A | 7/1997 | Landry | |
| 5,655,089 | A | 8/1997 | Bucci | |
| 5,699,528 | A | 12/1997 | Hogan | |
| 5,710,889 | A | 1/1998 | Clark et al. | |
| 5,717,868 | A | 2/1998 | James | |
| 5,727,249 | A | 3/1998 | Pollin | |
| 5,729,693 | A | 3/1998 | Holda-Fleck | |
| 5,745,886 | A | 4/1998 | Rosen | |
| 5,787,403 | A | 7/1998 | Randle | |
| 5,815,665 | A | 9/1998 | Teper et al. | |
| 5,832,460 | A * | 11/1998 | Bednar et al. | 705/27 |
| 5,845,267 | A | 12/1998 | Ronen | |
| 5,848,400 | A | 12/1998 | Chang | |
| 5,870,724 | A | 2/1999 | Lawlor et al. | |
| 5,873,072 | A | 2/1999 | Kight et al. | |
| 5,884,288 | A | 3/1999 | Chang et al. | |
| 5,884,290 | A | 3/1999 | Smorodinsky et al. | |
| 5,890,140 | A | 3/1999 | Clark et al. | |
| 5,903,721 | A | 5/1999 | Sixtus | |
| 5,903,732 | A | 5/1999 | Reed et al. | |
| 5,905,976 | A | 5/1999 | Mjolsnes et al. | |
| 5,920,847 | A | 7/1999 | Kolling et al. | |
| 5,930,759 | A | 7/1999 | Moore et al. | |
| 5,933,816 | A * | 8/1999 | Zeanah et al. | 705/35 |
| 5,943,656 | A | 8/1999 | Crooks et al. | |
| 5,956,695 | A | 9/1999 | Carrithers et al. | |
| 5,956,700 | A | 9/1999 | Landry | |
| 5,963,925 | A | 10/1999 | Kolling et al. | |
| 5,974,146 | A | 10/1999 | Randle et al. | |
| 5,978,780 | A | 11/1999 | Watson | |
| 6,029,151 | A | 2/2000 | Nikander | |
| 6,032,133 | A | 2/2000 | Hilt et al. | |
| 6,044,362 | A | 3/2000 | Neely | |
| 6,049,786 | A | 4/2000 | Smorodinsky | |
| 6,052,457 | A | 4/2000 | Abdelaal et al. | |
| 6,055,567 | A | 4/2000 | Ganesan et al. | |
| 6,058,380 | A | 5/2000 | Anderson et al. | |
| 6,065,012 | A | 5/2000 | Balsara et al. | |
| 6,070,150 | A | 5/2000 | Remington et al. | |
| 6,072,870 | A | 6/2000 | Nguyen et al. | |
| 6,078,907 | A | 6/2000 | Lamm | |
| 6,085,177 | A | 7/2000 | Semple et al. | |
| 6,097,834 | A | 8/2000 | Krouse et al. | |
| 6,098,053 | A | 8/2000 | Slater | |
| 6,119,106 | A | 9/2000 | Mersky et al. | |
| 6,119,107 | A | 9/2000 | Polk | |
| 6,119,109 | A | 9/2000 | Muratani et al. | |
| 6,122,625 | A | 9/2000 | Rosen | |
| 6,128,603 | A * | 10/2000 | Dent et al. | 705/40 |
| 6,173,272 | B1 | 1/2001 | Thomas et al. | |
| 6,182,052 | B1 | 1/2001 | Fulton et al. | |
| 6,289,322 | B1 * | 9/2001 | Kitchen et al. | 705/40 |
| 6,292,789 | B1 | 9/2001 | Schutzer | |
| 6,327,577 | B1 | 12/2001 | Garrison et al. | |
| 6,334,116 | B1 | 12/2001 | Ganesan et al. | |
| 6,363,362 | B1 | 3/2002 | Burfield et al. | |
| 6,381,584 | B1 | 4/2002 | Ogram | |
| 6,578,015 | B1 * | 6/2003 | Haseltine et al. | 705/34 |
| 2001/0002535 | A1 | 6/2001 | Liebig et al. | |
| 2001/0037296 | A1 | 11/2001 | Ganesan et al. | |
| 2001/0044776 | A1 | 11/2001 | Kight et al. | |
| 2002/0002536 | A1 * | 1/2002 | Braco | 705/40 |
| 2002/0010677 | A1 | 1/2002 | Kitchen et al. | |
| 2002/0013768 | A1 | 1/2002 | Ganesan | |
| 2002/0019809 | A1 | 2/2002 | Kitchen et al. | |
| 2002/0046165 | A1 | 4/2002 | Kitchen et al. | |
| 2002/0046166 | A1 | 4/2002 | Kitchen et al. | |
| 2002/0046167 | A1 | 4/2002 | Kitchen et al. | |
| 2002/0046168 | A1 | 4/2002 | Kitchen et al. | |
| 2002/0049672 | A1 | 4/2002 | Kitchen et al. | |
| 2002/0052840 | A1 | 5/2002 | Kitchen et al. | |
| 2002/0062282 | A1 | 5/2002 | Kight et al. | |
| 2002/0065773 | A1 | 5/2002 | Kight et al. | |
| 2002/0087427 | A1 | 7/2002 | Ganesan et al. | |
| 2002/0087461 | A1 | 7/2002 | Ganesan et al. | |
| 2002/0087465 | A1 | 7/2002 | Ganesan et al. | |
| 2002/0087468 | A1 | 7/2002 | Ganesan et al. | |
| 2002/0087469 | A1 | 7/2002 | Ganesan et al. | |
| 2002/0087471 | A1 | 7/2002 | Ganesan et al. | |
| 2002/0194125 | A1 | 12/2002 | Shimada | |

FOREIGN PATENT DOCUMENTS

| | | | |
|---|---|---|---|
| EP | 1049056 | A2 | 11/2000 |
| EP | 1052603 | A2 | 11/2000 |
| EP | 1083532 | A2 | 3/2001 |
| EP | 1091330 | A2 | 4/2001 |
| EP | 1111559 | A2 | 6/2001 |
| EP | 1136922 | A1 | 9/2001 |
| EP | 1136923 | A1 | 9/2001 |
| EP | 1136924 | A1 | 9/2001 |
| GB | 2294566 | A | 5/1996 |
| WO | WO99/05628 | | 2/1999 |
| WO | WO99/07102 | | 2/1999 |
| WO | WO99/10823 | | 3/1999 |
| WO | WO99/13421 | | 3/1999 |
| WO | WO99/15999 | | 4/1999 |
| WO | WO 99/18529 | | 4/1999 |
| WO | WO99/42944 | | 8/1999 |
| WO | WO99/58339 | | 11/1999 |
| WO | WO00/42551 | | 7/2000 |
| WO | WO00/48085 | | 8/2000 |
| WO | WO01/77938 | | 10/2001 |
| WO | WO 02/14985 | | 2/2002 |

OTHER PUBLICATIONS

Crone, American Banker Vo1.165, Iss.94, May 16, 2000.*

Council for Electronic Billing and Payment. Business-to-Business EIPP: Presentment Models and Payment Options, Part One: Presentment Models, Jan. 2001, National Automated Clearing House Association, Hemdon, VA.

Council for Electronic Billing and Payment, Business-to-Business EIPP: Presentment Models and Payment Options, Part Two: Payment Options, Jan. 2001, National Automated Clearing House Association, Herndon, VA.

Arald Jean-Charles and Suhas D. Joshi, Architectural Choices for OSS Integration, eAI Journal, Sep. 2001, pp. 59-63.

Interoperabill Initiative of the Banking Industry Technology Secretariat (BITS), Electronic Bill Presentment and Payment (EBPP) Business Practices, May 9, 2000, Edition 2.1, Draft for Comment, Council for Electronic Billing and Payment of the National Automated Clearing House Association (NACHA).

Business Practices Task Force of NACHA's Council for Electronic Billing and Payment, An Overview of Electronic Bill Presentment and Payment Operating Models: Process, Roles, Communications, and Transaction Flows, Apr. 9, 1999.

Pricewaterhousecoopers, Electronic Bill Presentment and Payment: A Primer, Zurich-Oerlikon.

James S. Diggs, Electronic Commerce and the Document: An Old Lexicon Re-Energized, Xploration Spring, 1997, pp. 26-29.

Netdelivery Corporation, EDM: Electronic Delivery Management: The Delivery Service for Electronic Commerce, Boulder, CO.

(56) References Cited

OTHER PUBLICATIONS

Robert Landry, Ian Rubin, Richard Bell, Retail Banking Delivery Technology: Channels in Transition, Financial Services Technology Conference, Apr. 27-28, 1998, The Tower Group, Newton, MA.
Robert Landry, Forecasting How U.S. Delivery Channels Will Play Out, FutureBanker, Aug. 1997, pp. 46-49.
Gary B., Meshell, A Perspective on Electronic Commerce and Payments, Price Waterhouse.
No Author Name Given, Visa—Home Banking & Bill Payment Solution, Visa Interactive.
No Author Name Given, Paysense: The Way Payments Will Be, Trisense Software, Ltd., Burnsville, MN.
Killen & Associates, Electronic Bill Presentment and Payments: Markets, Framework and Suppliers, vol. 1 of a 3 Study Set, Palo Alto, CA.
Thomas P. Vartanian, Future Banking: Reinventing the Bank as an Idea Factory, American Banker, Aug. 19, 1998.
Thomas P. Vartanian, Future Banking: Key Question for Emerging Systems: Where is the Money? American Banker, Jun. 17, 1996.
Charles G. Moody, III, From the Publisher. Outsourcing, American Waste Digest, Jul. 1998, p. 9.
No Author Name Given, Everyone's Knocking on Home Banking's Door, Business Week, Sep. 24, 2001.
No Author Name Given, Bill Gates is Rattling the Teller's Window, Business Week, Sep. 24, 2001.
No Author Name Given, Call it E-Money Management, Business Week, Sep. 24, 2001.
The Advisory Board Company, A Proposition Beyond Rescue: The Pure Play Advantage, 1996, pp. 41-72.
The Advisory Board Company, Chapter III: Creating New Payments Businesses, 1996, pp. 283-298.
The Advisory Board Company, VI: Creating New Payments Businesses, 1996, pp. 113-146.
ASC X12 Finance Subcommittee, Models for Consumer Billing and Payment Systems, Jun. 1995, Technical Report Type 2.
ASC X12 Finance Subcommittee, Models for Consumer Billing and Payment Systems, Oct. 1995, Technical Report Type II.
Michael C. McChesney, Banking in Cyberspace: an investment in itself, Banking/Investing, IEEE Spectrum, Feb. 1997, pp. 54-63.
No Author Name Given, Online Banking Report, Home Banking Partners, Issue 32, Dec. 1997.
Chip Wickenden, CCM, The Next Wave, Consumer EDI.
Just In Time Solutions, AT&T and Intuit, Open Internet Billing: White Paper, Jun. 1998.
David Lamm, The Effect of the Internet on Payment Processing, The Association for Work Process Improvement, Apr. 27, 1999, Boston, MA.
Leslie Thwaits, The Check's on the Net: CheckFree is Making Electronic Commerce Hassle Free, SourceBook, Apr. 1999, pp. 17-20, The Reddy Corporation International.
ASC X12 Finance Subcommittee, Reference Model for Addressing Financial Transactions, Technical Report Type 2, Jun. 1996.
Visa, Consumer Electronic Invoice Presentment: Not Your Everday EDI, SteriConf.
ASC X12 Finance Subcommittee, Consumer Service Provider Billing & Payment System Work Group, Meeting Notes from Jun. 1995 X12F Trimester Meeting, Sep. 1995.
Visa, Bill Interest in Electronic Remittance, Bill Payment Council Meeting, Oct. 17, 1994, Methesda, MD.
ASC X12 Finance Subcommittee, Models for Payment Systems, Technical Report Type 2, ASC X12 Procedures Review Board, Feb. 1995.
Richard K. Crone, Screen Scraping: The Monster IBPP Wave You Absolutely Must Catch, IBPP Strategies and Trends, Dove Consulting.
Richard K. Crone, Unlocking Treasures Untold: The Revenue Generating Power of IBPP and Anonymous Profile Marketing, Dove Consulting.
A. Litan, The Consumer E-Billing Hype Cycle, Research Note, Dec. 19, 2000, GartnerGroup.
A. Litan, Consumer E-Billing Shakeout: The Dust Starts to Settle, Research Note Oct. 3, 2000, GartnerGroup.
K. Kerr and A. Litan, Trends in Bsuiness-to-Consumer Electronic Bill Presentment and Payment, Context Overview Report, Aug. 25, 2000, GartnerGroup.
A. Litan, Consumer E-Bill Payment: Built, but When Will They Come? Research Note, Feb. 18, 2000, GartnerGroup.
A. Litan, Three Banks Enter E-Billing Race with Post Office Model, Research Note, Jul. 15, 1999, GartnerGroup.
A. Litan, Future Bill Distribution: Internet Post Office Model, Research Note, Apr. 9, 1999, GartnerGroup.
Gaston Hummel, EBPP, Group 1 Software Europe, Ltd., Sep. 11, 2001.
Nicolette Lemmon, David Gourley and James Ward, Member Acceptance of Electronic Access Systems: Innovators versus Laggards, Center for Credit Union Research, University of Wisconsin—Madison School of Business and the Filene Research Institute, 1999.
Billserv, EBPP White Paper.
David B. Humphrey, Ph.D., Prospective Changes in Payment Systems: Implications for Credit Unions, Florida State University, Center for Credit Union Research, University of Wisconsin—Madison School of Business and the Filene Research Institute, 1997.
Jody Cornish and Octavio Marenzi, Scan and Pay Services: The Future of Electronic Bill Presentment, Celent Communications, May 2000, Cambridge, MA.
Jody Cornish, Octavio Marenzi and Sang Lee. Banks and Electronic Bill Presentment: A Survey, Celent Communications, Apr. 2000, Cambridge, MA.
Avolent, Using BizCast to Capture ROI and Automate the Invoice-to-Pay Process, Avolent B2B White Paper, 2001, pp. 20-28.
Avolent, The Return on Investment of EIPP, Avolent B2B White Paper, pp. 14-19.
Avolent, Market Evolution for EIPP, Avolent B2B White Paper, pp. 10-13.
Greg Sward and Brian Valente, Successfully Automating the Invoice-to-Pay Process, Avolent B2B White Paper, Feb. 2001, pp. 1-9.
Stoneman, B., Fitting It All Together, Banking Strategies, Mar./Apr. 2000, vol. 76, No. 2. pp. 50-58.
Hallerman, D., Banks Strike Back With an E-Bill Challenge. Bank Technology News, Aug. 1999.
No Author Name Given, Non-Bank Puts E-Payments at ATMs to The Test, Bank Network News, May 1999.
Sharon Osberg, "Wells Fargo: Standards-Based Electronic Bill Presentment and Payment (EBPP)", Nov. 1999, XP-002192923.

* cited by examiner

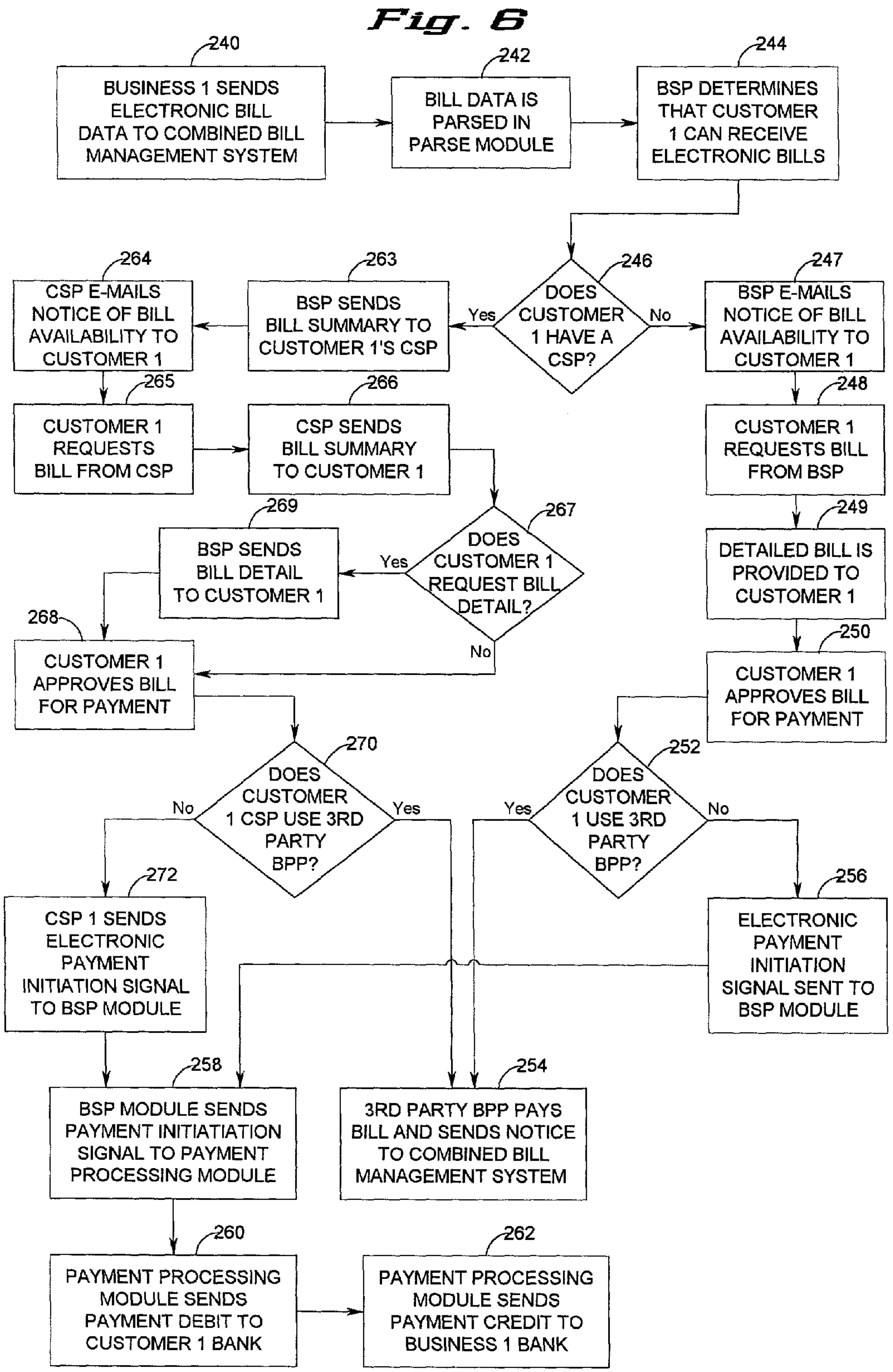

Fig. 6
240
BUSINESS 1 SENDS ELECTRONIC BILL DATA TO COMBINED BILL MANAGEMENT SYSTEM
242
BILL DATA IS PARSED IN PARSE MODULE
244
BSP DETERMINES THAT CUSTOMER 1 CAN RECEIVE ELECTRONIC BILLS
246
DOES CUSTOMER 1 HAVE A CSP?
Yes
No
263
BSP SENDS BILL SUMMARY TO CUSTOMER 1'S CSP
264
CSP E-MAILS NOTICE OF BILL AVAILABILITY TO CUSTOMER 1
247
BSP E-MAILS NOTICE OF BILL AVAILABILITY TO CUSTOMER 1
265
CUSTOMER 1 REQUESTS BILL FROM CSP
266
CSP SENDS BILL SUMMARY TO CUSTOMER 1
248
CUSTOMER 1 REQUESTS BILL FROM BSP
267
DOES CUSTOMER 1 REQUEST BILL DETAIL?
Yes
No
269
BSP SENDS BILL DETAIL TO CUSTOMER 1
249
DETAILED BILL IS PROVIDED TO CUSTOMER 1
268
CUSTOMER 1 APPROVES BILL FOR PAYMENT
250
CUSTOMER 1 APPROVES BILL FOR PAYMENT
270
DOES CUSTOMER 1 CSP USE 3RD PARTY BPP?
No
Yes
252
DOES CUSTOMER 1 USE 3RD PARTY BPP?
Yes
No
272
CSP 1 SENDS ELECTRONIC PAYMENT INITIATION SIGNAL TO BSP MODULE
256
ELECTRONIC PAYMENT INITIATION SIGNAL SENT TO BSP MODULE
258
BSP MODULE SENDS PAYMENT INITIATION SIGNAL TO PAYMENT PROCESSING MODULE
254
3RD PARTY BPP PAYS BILL AND SENDS NOTICE TO COMBINED BILL MANAGEMENT SYSTEM
260
PAYMENT PROCESSING MODULE SENDS PAYMENT DEBIT TO CUSTOMER 1 BANK
262
PAYMENT PROCESSING MODULE SENDS PAYMENT CREDIT TO BUSINESS 1 BANK

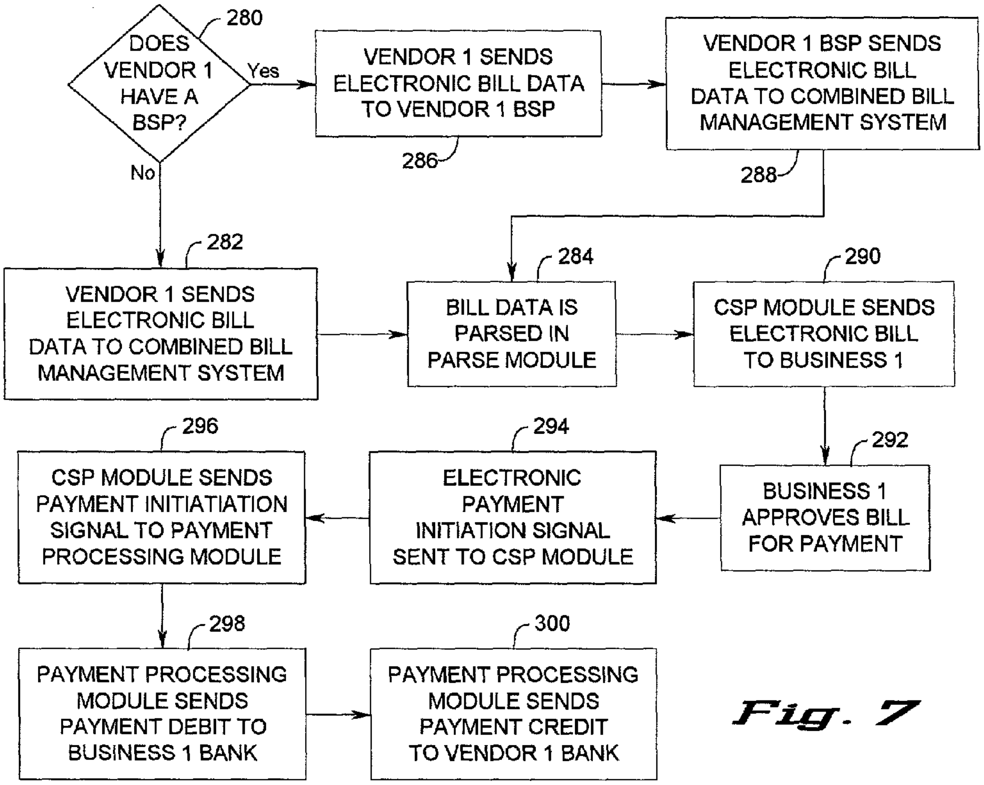
Fig. 7
Fig. 8
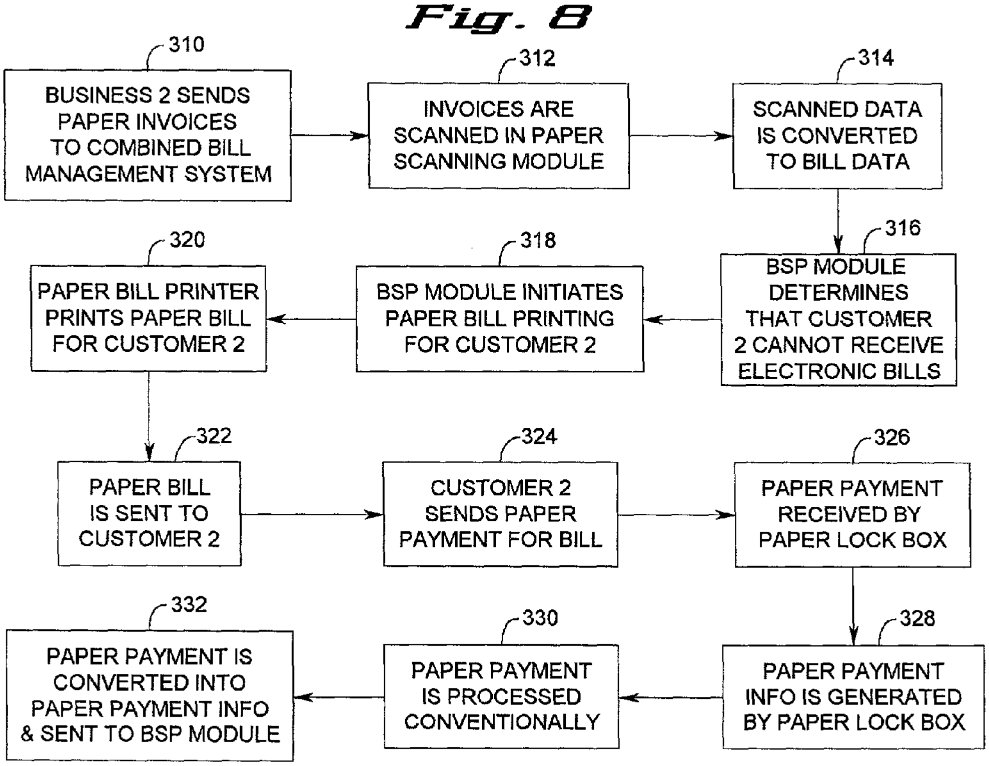

BUSINESS COMBINED BILL MANAGEMENT SYSTEM AND METHOD

IDENTIFICATION OF RELATED PATENT APPLICATION

This application is related to concurrently filed copending U.S. patent application Ser. No. 10/141,146, entitled "Integrated Bill Presentment and Payment System and Method of Operating the Same," which application is hereby incorporated herein by reference.

BACKGROUND OF THE INVENTION

Field of the Invention

The present invention relates generally to bill presentment and payment, and more particularly to an integrated bill management system and an associated method for use therewith for managing the delivery of and handling payment associated with both outgoing invoices from businesses to their customers and incoming bills from vendors to the businesses.

The history of the use of electronic funds transfers by businesses to facilitate their businesses goes back to the mid 1980's, when a few large companies began developing an EDI (Electronic Data Interchange) system which would allow it to both order parts and to be invoiced and pay for the parts. EDI is a protocol which allows unrelated, stand-alone systems to communicate with each other through the use of a neutral or common data format. EDI systems have been used by very large businesses such as General Motors since the late 1980's to facilitate the ordering of inventory, and represent a type of integrated management system which has financial overtones. Such EDI systems typically include the capability for a company to order materials, and to be billed for and to electronically pay for the materials ordered by a company from its vendors.

Unfortunately, they are dependent upon the use of common standards which may exist among certain large companies for their convenience, but which do not exist as yet among a broad cross section of companies and businesses. In addition, these systems deal only with the ordering, invoicing, and paying of suppliers. Despite the fact that such systems have been known for well over a decade, no marked improvement or widespread adoption of them has occurred to date.

Another area in which electronic business principals have found application is in the area of electronic bill presentment and payment, which has been developing slowly. In view of the high cost of sending conventional bills and the delay and cost of receiving payment by mail, the potential beneficial effect of electronic bill payment for cost reduction and revenue production to businesses would seem to represent a tremendous opportunity. However, the electronic bill payment industry has not matured rapidly. Many billers have been unable to reach enough customers to justify either the initial cost or the ongoing cost of offering online bill presentment and payment.

It is accordingly the primary objective of the present invention that it provide an integrated, combined bill management system for use by businesses which interfaces with both customers and vendors of the businesses. It is a first closely related objective of the present invention that it enable the presentation of invoices to customers of the businesses, and that it further facilitate payment by the customers. It is a second closely related objective of the present invention that it enable the obtaining of bills from the vendors and that it present these bills electronically to the businesses and facilitate their electronic payment by the businesses.

It is a further objective of the business combined bill management system of the present invention that it be capable of accepting any form of customer invoicing information from businesses, including either paper or electronic invoice information. It is a still further objective of the present invention that it be capable of supplying either electronic or paper invoices to customers, irrespective of the form of invoice originally generated and provided by the businesses. It is yet another objective of the present invention that be capable of accepting either paper or electronic payment from customers irrespective of the form in which the invoice was sent to the customers.

It is another objective of the business combined bill management system of the present invention that it be capable of accepting either paper or electronic bills from vendors, while providing electronic bills to the businesses for review and payment. It is still another objective of the present invention that in its preferred embodiment it present an operational cash flow management capability to enable the businesses it serves to well understand both their present and anticipated future cash flow position. It is a further objective of the present invention that it be capable of simultaneously serving a plurality of businesses, each of which has both multiple customers and multiple vendors.

The business combined bill management system of the present invention must also operate in a manner which is both secure and effective, and it should require little or no effort or special training for the employees of businesses which use it to handle their invoicing of and collection from customers, and review and payment of bills from their vendors. In order to enhance the market appeal of the business combined bill management system of the present invention, it should also be economically efficient by virtue of its integrated design to minimize its cost and thereby afford it the broadest possible market. Finally, it is also an objective that all of the aforesaid advantages and objectives of the business combined bill management system of the present invention be achieved without incurring any substantial relative disadvantage.

SUMMARY OF THE INVENTION

The disadvantages and limitations of the background art discussed above are overcome by the present invention. With this invention, a business combined bill management system for use with businesses is provided, the system and an associated method working with the customers and vendors of each of these businesses to integrate the incoming and outgoing bills of the companies served by the business combined bill management system. The business combined bill management system has four primary components: a BSP ("biller service provider") module, a CSP ("customer service provider") module, a payment processing module, and an operational cash flow module. The system with these four modules is interposed between the businesses which it serves and their customers and vendors.

The BSP module functions to provide invoices from the businesses to customers, and to facilitate payment from the customers. Electronic billing data is obtained from the businesses, either directly or by scanning paper bills into an electronic format. The electronic billing data is then parsed to obtain the data which is then presented to the BSP module and is used to provide bills to the businesses' customers. The bills are presented to the customers by the BSP module, preferably electronically, but also as paper bills for those customers which are unable to accept electronic bills. The customers may pay either electronically or in paper form, and the data on the customer payments is either provided directly to the BSP module if is in electronic form, or it is converted into electronic form. If a customer uses a third party bill payment processor, the BSP module obtains an indication of payment from the third party bill payment processor.

The CSP module functions to provide bills from the vendors to the businesses, and facilitates the payment of the bills by the businesses. Electronic billing data is obtained from the vendors, either directly or by scanning paper bills into an electronic format. Electronic billing data can also be obtained from third party BSP's, either by receiving summary information or by "scraping" the website of the BSP. The electronic billing data is them parsed to obtain the data which is provided to the CSP module and is used to provide the vendors' bills to the businesses. The bills are presented electronically to the businesses by the CSP module, which provide payment instructions back to the CSP module.

The payment processing module facilitates payments for both the BSP module and the CSP module. It does so by sending debit and credit instructions to the businesses' banks, the customers' banks, and the vendors' banks. The payment processing module can initiate the transmission of paper payments when necessary. It can make the payments at scheduled times, or immediately, depending upon the particular circumstances.

The operational cash flow module takes information which is provided to it and uses the information to perform calculations as to present and future projected cash flow of each of the businesses serviced by the combined bill management system of the present invention. The BSP module, the CSP module, and the payment processing module all provide information to the operational cash flow module. In addition, information from the businesses' banks and their payroll information (and/or other non-invoice-based cash flow information) is also provided to the operational cash flow module.

It may therefore be seen that the present invention teaches an integrated, combined bill management system for use by businesses which interfaces with both customers and vendors of the businesses. The business combined bill management system enables the presentation of invoices to customers of the businesses, and it further facilitates payment by the customers. The business combined bill management system of the present invention enables the obtaining of bills from the vendors and it presents these bills electronically to the businesses and facilitates their electronic payment by the businesses.

The business combined bill management system of the present invention is capable of accepting any form of customer invoicing information from businesses, including either paper or electronic invoice information. The business combined bill management system is capable of supplying either electronic or paper invoices to customers, irrespective of the form of invoice originally generated and provided by the businesses. The business combined bill management system of the present invention is capable of accepting either paper or electronic payment from customers irrespective of the form in which the invoice was sent to the customers.

The business combined bill management system of the present invention is capable of accepting either paper or electronic bills from vendors, while providing electronic bills to the businesses for review and payment. The business combined bill management system in its preferred embodiment also can advantageously present an operational cash flow management capability to enable the businesses it serves to understand both their present and anticipated future cash flow position. The business combined bill management system of the present invention is capable of simultaneously serving a plurality of businesses, each of which has both multiple customers and multiple vendors.

The business combined bill management system of the present invention operates in a manner which is both secure and effective, and it requires little or no effort or special training for the employees of businesses which use it to handle their invoicing of and collection from customers, and review and payment of bills from their vendors. The business combined bill management system of the present invention is also economically efficient by virtue of its integrated design to minimize its cost and thereby afford it the broadest possible market. Finally, all of the aforesaid advantages and objectives of the business combined bill management system of the present invention are achieved without incurring any substantial relative disadvantage.

DESCRIPTION OF THE DRAWINGS

These and other advantages of the present invention are best understood with reference to the drawings, in which:

FIG. 6 is a flow diagram illustrating the process by which the combined bill management system illustrated in FIGS. 2 through 5 facilitates the delivery of billing information from a business generating electronic billing information to customers which can receive electronic billing information and the electronic payment of the bills by the customers;

FIG. 7 is a flow diagram illustrating the process by which the combined bill management system illustrated in FIGS. 2 through 5 facilitates the receipt of billing information from a vendor generating electronic billing information to a business and the electronic payment of the bills from the vendor;

FIG. 8 is a flow diagram illustrating the process by which the combined bill management system illustrated in FIGS. 2 through 5 facilitates the delivery of billing information from a business generating paper invoices to customers which accept only paper billing information and the paper payment of the bills by the customers;

DETAILED DESCRIPTION OF THE PREFERRED EMBODIMENT

Figure 1:
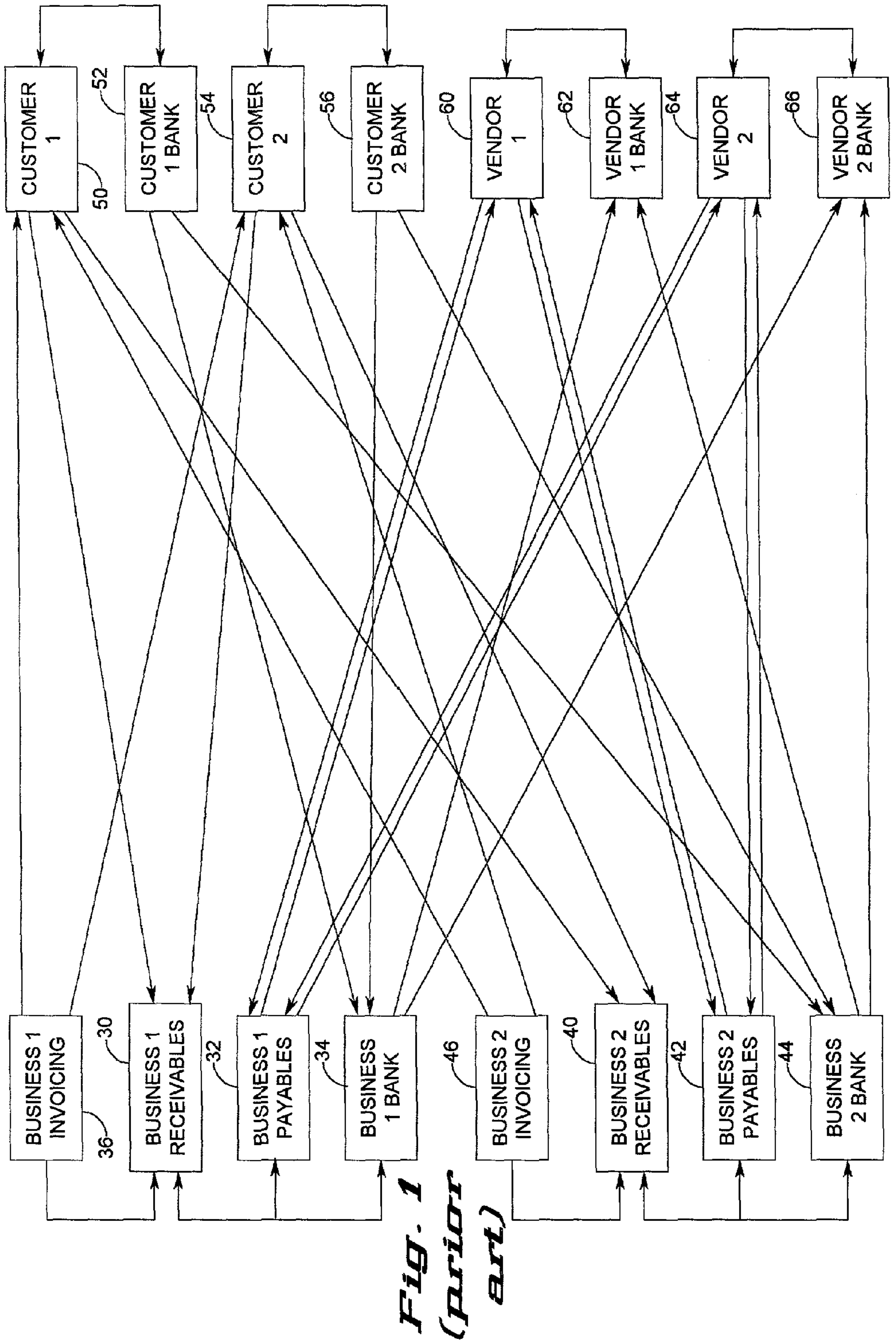
Fig. 1 (prior art)
FIG. 1 is a functional schematic diagram of previously known arrangements by which a business bills customers and receives payment from the customers, and receives bills from vendors and pays the vendors.

Prior to beginning a discussion of the preferred embodiment the business combined bill management system of the present invention, it is helpful to briefly describe the status quo in terms of how businesses typically deal with bills to be sent to their customers and bills received from their vendors. Referring thus to FIG. 1, as an exemplar the interrelationship between two businesses and two customers and two vendors is illustrated. A first business has receivables 30, payables 32, a bank 34, and an invoicing 36. A second business has receivables 40, payables 42, a bank 44, and an invoicing 46. The two businesses both deal with a first customer 50 which has a first customer bank 52, a second customer 54 which has a second customer bank 56, a first vendor 60 which has a first vendor bank 62, and a second vendor 70 which has a second vendor bank 72.

The first business receivables 30, the first business payables 32, and the first business bank 34 are shown as interconnected, and the first business receivables 30 receives information from the first business invoicing 36. Similarly the second business receivables 40, the second business payables 42, and second first business bank 44 are shown as interconnected, and the second business receivables 40 receives information from the second business invoicing 46.

For billing, the first business invoicing 36 for the first business and the second business invoicing 46 for the second business each send invoices to the first customer 50 and the second customer 54. The first customer 50 and the second customer 54, upon deciding to pay the invoices, send payments for the invoiced amounts to the first business receivables 30 of the first business and the second business receivables 40 of the second business. Settlement occurs when funds are transferred from the first customer bank 52 for the first customer and the second customer bank 56 for the second customer to the first business bank 34 for the first business and to the second business bank 44 for the second business.

For paying vendors, the first vendor 60 and the second vendor 64 each send invoices to the first business invoicing 36 for the first business and the second business invoicing 46 for the second business. The first business and the second business, upon deciding to pay the invoices, send payments for the invoiced amounts to the first vendor 60 and the second vendor 64. Financial settlement occurs when funds are transferred from the first customer bank 52 and the second customer bank 56 to the first business bank 34 for the first business and to the second business bank 44 for the second business. It will be appreciated by those skilled in the art that this conventional process is hardly efficient, and, for the most part, involves paper invoices and paper payments and mail.

Figure 2:
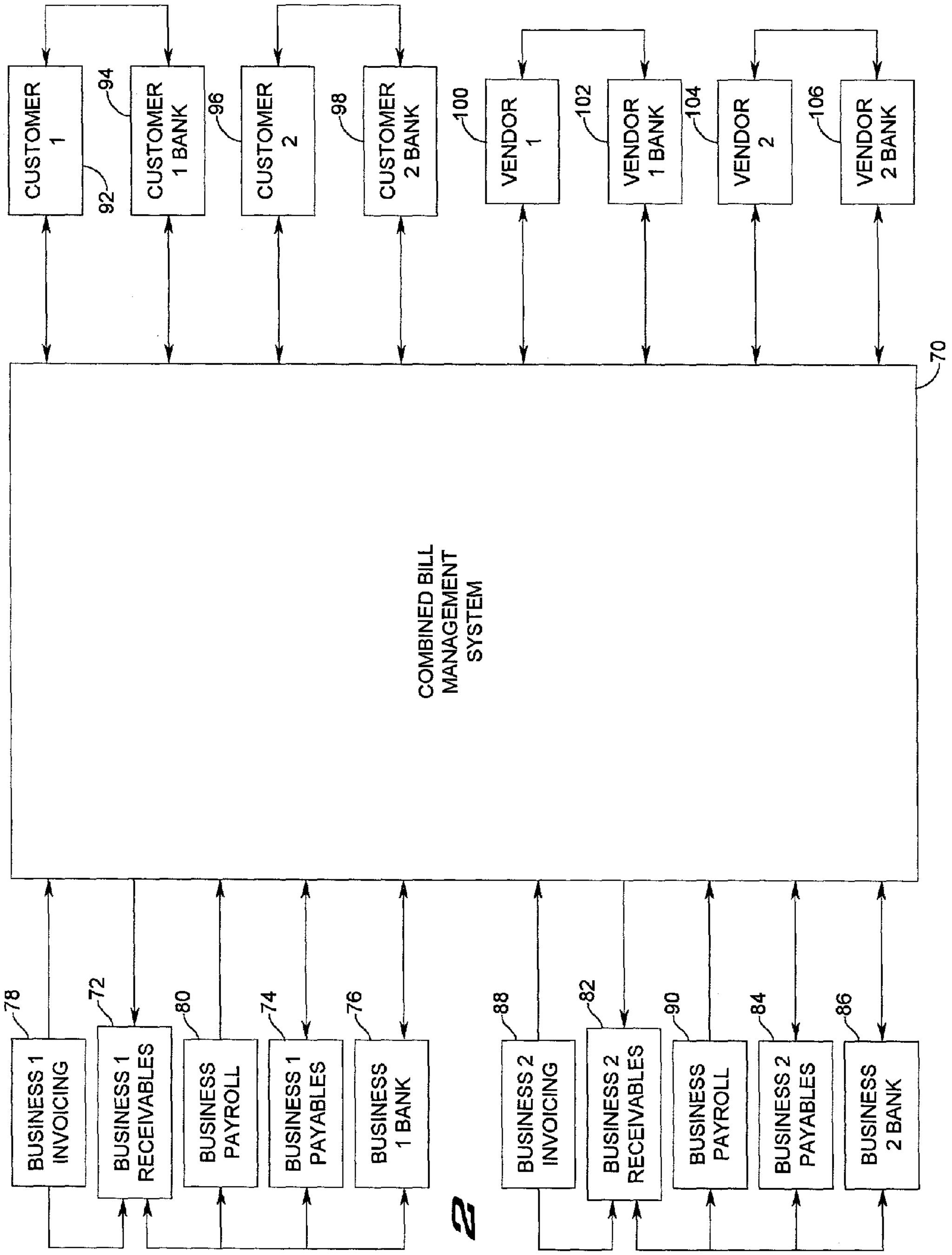
FIG. 2 is a functional schematic diagram showing a combined bill management system constructed and operating according to the teachings of the present invention and its interconnection to two businesses, two customers, and two vendors, and their respective financial institutions.

Referring now to FIG. 2, a combined bill management system 70 is illustrated which coordinates bill management for two businesses with two customers and two vendors. Although this example is relatively simple for purposes of explaining the operation of the business combined bill management system of the present invention, it will be understood that the combined bill management system 70 can be used by many businesses to coordinate their bill management for their customers and vendors, with appropriate scaling of the combined bill management system 70 allowing for the accommodation of virtually any desired capacity. Each of the two businesses depicted has four components and a bank, with the four components being those found in most accounting systems and including receivables, payables, invoicing, and payroll functions.

A first business has a first business receivables component 72, a first business payables component 74, a first business bank 76, a first business invoicing component 78, and a first business payroll component 80, with all five of these components being linked together and to the combined bill management system 70. A second business has a second business receivables component 82, a second business payables component 84, a second business bank 86, a second business invoicing component 88, and a second business payroll component 90, with all five of these components being linked together and to the combined bill management system 70. The exact nature of the linkages of these components of the first and second businesses to the combined bill management system 70 will become apparent later in conjunction with the discussion's of FIGS. 4 and 5 below.

A first customer component 92 is linked to a first customer bank 94, and both of these components are linked to the combined bill management system 70. A second customer component 96 is linked to a first customer bank 98, and both of these components are linked to the combined bill management system 70. A first vendor component 100 is linked to a the first vendor bank 102, and both of these components are linked to the combined bill management system 70. A second vendor component 104 is linked to a second vendor bank 106, and both of these components are linked to the combined bill management system 70. The exact nature of the linkages of these components of the first and second businesses and the first and second vendors to the combined bill management system 70 will become apparent later in conjunction with the discussion's of FIGS. 4 and 5 below.

Figure 3:
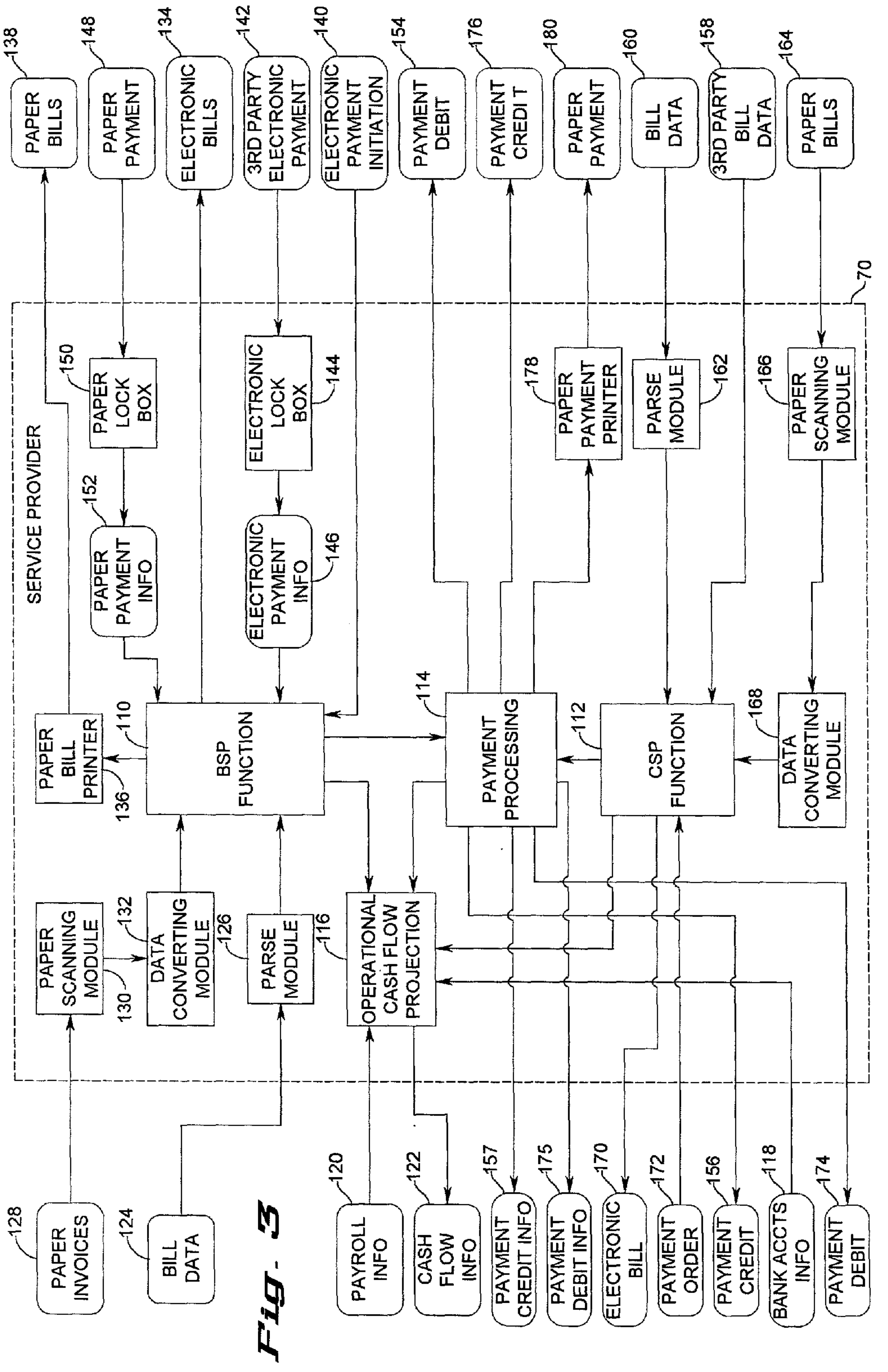
FIG. 3 is a functional schematic diagram of the combined bill management system illustrated in FIG. 2, showing the various bill management components included therein as well as exemplary inputs thereto and outputs therefrom.

Referring next to FIG. 3, an exemplary depiction of components which may be included in the combined bill management system 70 of the present invention together with the inputs to and outputs from the combined bill management system 70 is provided. Four primary modules and a number of lesser modules are shown. The first of these primary modules is a the BSP ("biller service provider") module 110. Conventionally, a BSP is a third party service provider which signs up multiple billers, receives billing information from each of them, and converts the bills to electronic form so that they may be presented to customers of the serviced billers. In the business combined bill management system of the present invention, the BSP function module 110 functions to provide invoices from the businesses to customers, and to facilitate payment from the customers.

The second primary module is a CSP ("customer service provider") module 112. Conventionally, a CSP is a third party service provider which enrolls multiple customers and delivers electronic bills to them, as well as facilitating electronic payment of the bills by the customers. In the business combined bill management system of the present invention, the CSP function module 112 functions to provide bills from the vendors to the businesses, and to facilitate payment of the bills by the businesses.

The third primary module is a payment processing module 114. Conventional payment providers are typically associated with either a BSP (a "biller payment provider") or with a CSP (a "customer payment provider"), and facilitate payment by customers to billers, the customers' financial institutions, and the billers' financial institutions. In the business combined bill management system of the present invention, the payment processing module 114 may facilitate payments for either the BSP function module 110 or the CSP function module 112. As such, both the BSP function module 110 and the CSP function module 112 are operatively connected to the payment processing module 114 to cause it to initiate payments: payments initiated on behalf of the BSP function module 110 are from customers to the businesses, and payments initiated on behalf of the CSP function module 112 are from the businesses to its vendors.

The fourth primary module is an operational cash flow projection module 116, which is used to provide the businesses with both actual and projected cash flow information. The operational cash flow projection module 116 is operatively connected to both the BSP function module 110 and the CSP function module 112 to derive information from them relating both to invoices sent by the businesses to their customers and bills sent by the businesses' vendors to the businesses. The operational cash flow projection module 116 is also connected to receive information from the payment processing module 114 relating to payments made by it both from customers to the businesses and from the businesses to their vendors.

Two additional inputs are provided to the operational cash flow projection module 116 from outside the combined bill management system 70. The first such input is business bank account information 118, which is supplied directly from the banks at which accounts for the businesses are located to the operational cash flow projection module 116. This information is typically updated at least once per business day, although it may be updated more frequently, with the frequency of such updates depending principally upon how often the banks from which the information is derived update account information. The second input to the operational cash flow projection module 116 is business payroll information 120, which is supplied directly from the payroll modules of the businesses, and typically contains information which is forward looking (i.e., information as to the dates and projected amounts of future payroll payments).

The operational cash flow projection module 116 thus takes all of the information which is provided to it, performs calculations as to present and future projected cash flow of each of the businesses serviced by the combined bill management system 70. This present and projected future cash flow information is provided as an output referred to as cash flow information 122, which will be provided to the businesses serviced by the combined bill management system 70 and the business combined bill management system of the present invention.

Other components of the combined bill management system 70 and inputs to and outputs from the combined bill management system 70 may now be discussed, first with reference to those which relate to the BSP function of the combined bill management system 70 and then with regard to its CSP function. The first type of information supplied to the combined bill management system 70 from businesses is invoice information, which can be provided in either electronic or in paper format. The preferred mode is in electronic form as bill data 124, which is supplied to a parse module 126 in the combined bill management system 70.

The parse module 126 extracts data in the desired data fields from the bill data 124 and supplies the data to the BSP function module 110. The bill data 124 may be in any of a number of different formats, and the parse module 126 must identify the business from which the data comes, identify which desired data is associated with each of the customers from that business, and identify the desired data for each of these customers. In some instances, the bill data 124 may be in the form of a print stream, and in others the bill data 124 may be in various other formats. The parse module 126 must be capable of identifying the format of each of these and obtaining the necessary data from the bill data 124.

Instead of supplying invoice information electronically, it is also possible for the business combined bill management system of the present invention to obtain the information from paper invoices 128 which are supplied to a paper scanning module 130 in the combined bill management system 70. The data obtained by scanning the paper invoices 128 in the paper scanning module 130 is provided to a data converting module 132, which extracts the needed billing information from the scanned information. As mentioned above, the data needed is information which identifies the business from which the data comes, identifies which desired data is associated with each of the customers from that business, and identifies the desired data for each of these customers. The data converting module 132 supplies this data to the BSP function module 110.

The BSP function module 110 uses the information to determine when customers should be billed. For example, the billing information may specify a date upon which the billing information should be sent to the customers. If not, it may be presumed that the billing information should be delivered to the customers as soon as possible. The billing information may be delivered to customers either electronically or by conventional mailed paper bills. The preference, of course, is for electronic delivery since it is cheaper and faster. If the invoices are to be delivered to a customer electronically, they are provided by the BSP function module 110 as electronic bills 134, another output of the combined bill management system 70.

If, on the other hand, the invoices are to be delivered in paper format, they are printed in a paper bill printer module 136. The paper bill printer module 136 may be either included in the combined bill management system 70, or it may be farmed out to an outside vendor (not shown in FIG. 3) who will print and mail the invoices to the customers. If an outside vendor is not used, the paper bill printer module 136 will also mail the invoices to the customers, and these paper bills 138 are another output of the combined bill management system 70. Typically, paper bills are sent only to customers who cannot receive bills in electronic format. In the case of those customers who want to receive both an electronic bill and a paper bill, they may make this election and would then be sent both an electronic bill and a paper bill.

Targeted messaging may also be used in conjunction with the delivery of bills to customers. For example, targeted messaging may be delivered to customers through the inclusion of such messages and/or other content in either electronic bills or paper bills. Such messaging may be marketing material relating to the business or its products or services, or, alternately, it may relate to another company whose products or services are being marketed through a tie-in to the business sending the bill. It may be complete in and of itself, or it may consist at least in part of a web link to the business's website (or to the tied-in company's website). In this regard, the business combined bill management system of the present invention can also be used to distribute information other than bills, such as statements and other communications for customers.

Similarly, the method of payment used by customers may vary, with customers choosing either electronic or paper payment. Direct electronic payment in response to the receipt of an electronic invoice is the simplest mode, with an electronic payment initiation signal 140 being provided by the customer directly to the BSP function module 110 of the combined bill management system 70. If the customer uses a third party for payment (such as its own CSP), either electronic or paper invoices may be paid electronically. In this event, the third party will, upon making payment outside of the system of the combined bill management system 70, send a third party electronic payment signal 142 to an electronic lock box 144 contained in the combined bill management system 70. The electronic lock box 144 determines the customer, the amount of payment, and the date that payment was initiated from information contained in the electronic lock box 144. The electronic lock box 144 then sends this electronic payment information 146 (as opposed to an electronic payment) to the BSP function module 110.

If the customer is making a paper payment 148, it would be provided to a paper lock box 150 in the combined bill management system 70. The paper lock box 150 serves to provide information regarding the identity of the customer including at least the account number with the business, the amount being paid, and the customer's bank information. This information is referred to as paper payment information 152, and is supplied to the BSP function module 110.

Following the receipt of information as to a payment to be made by the combined bill management system 70, the BSP function module 110 sends the pertinent information to the payment processing module 114, which will then handle the payment. The payment processing module 114 sends a payment debit 154 to the customer's bank, and a payment credit 156 to the business's bank to effect the payment. The payment processing module 114 also sends payment credit information 157 to the business, and may optionally send payment debit information to the customer (not shown in the figures). Note that if the payment was handled by a third party making the third party electronic payment signal 142, the payment processing module 114 will not be making the payment; in this case, the information supplied to the BSP function module 110 as the electronic payment information 146 is merely informational, and is not used by the payment processing module 114.

Next, the remaining components of the combined bill management system 70 will be discussed with reference to the CSP function of the combined bill management system 70. Bill data from vendors is supplied to the combined bill management system 70 in either electronic or in paper format. The preferred mode is in electronic form, either as third party bill data 158 if the vendor uses a BSP ("biller service provider") or as bill data 160, which is supplied to a parse module 162 in the combined bill management system 70.

The parse module 162 extracts data in the desired data fields from the bill data 160 and supplies the data to the CSP function module 112. The bill data 160 may be in one of a number of different formats, and the parse module 162 must identify the vendor from which the data comes, and identify the desired transactions for each of these vendors. In some instances, the bill data 160 could be in the form of a print stream, and in others the bill data 160 may be in various other formats. The parse module 162 must be capable of identifying the format of each of these and obtaining the necessary data from the bill data 160.

Instead of supplying bill data electronically, it is also possible for the business combined bill management system of the present invention to obtain the information from paper bills 164 which are supplied to a paper scanning module 166 in the combined bill management system 70. The data obtained by scanning the paper bills 164 in the paper scanning module 166 is provided to a data converting module 168, which extracts the billing information from the scanned information. As mentioned above, the data needed is information which identifies the vendor from which the data comes, and identifies the desired transactions for each of these vendors. The data converting module 168 supplies this data to the CSP function module 112.

The CSP function module 112 delivers the billing information to the business as an electronic bill 170 upon receipt, the electronic bill 170 being another output of the combined bill management system 70. Direct electronic payment is used to pay bills received by the businesses, with an electronic payment order signal 172 being provided by the business directly to the CSP function module 112 of the combined bill management system 70.

Following the receipt of information as to a payment to be made by the combined bill management system the combined bill management system 70 to a vendor, the CSP function module 112 sends the pertinent information to the payment processing module 114, which will then handle the payment. The payment processing module 114 sends a payment debit 174 to the business's bank, and a payment credit 176 to the vendor's bank to effect the payment. If the payment to a vendor is to be by paper check, then the payment processing module 114 causes a paper payment printer 178 to send a paper payment 180 to the vendor. The payment processing module 114 also sends payment debit information 175 to the business, and may optionally send payment credit information to the vendor (not shown in the figures). This completes the discussion of the basic operation of the combined bill management system 70.

Figure 4:
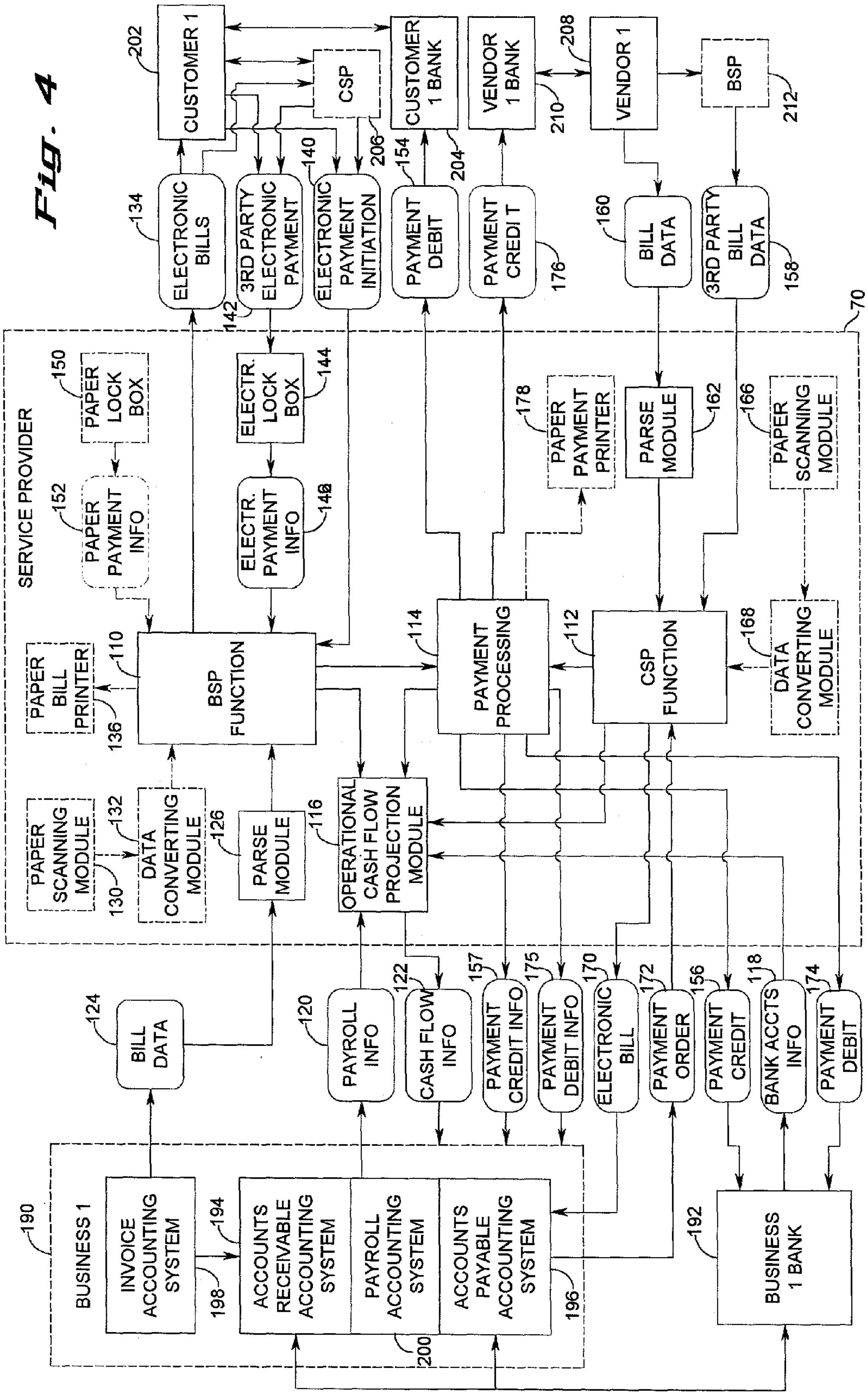
FIG. 4 is a functional schematic diagram showing the combined bill management system illustrated in FIG. 3 with a first business and two of its customers and two of its vendors, and their respective financial institutions.

Turning next to FIG. 4, the combined bill management system 70 of FIG. 3 is illustrated in a configuration to serve a first business 190 having a first business bank 192. The first business 190 includes an accounts receivable accounting system 194, an accounts payable accounting system 196, an invoice accounting system 198, and a payroll accounting system 200. The accounts receivable accounting system 194, the accounts payable accounting system 196, and the payroll accounting system 200 are linked together and to the first business bank 192, and the accounts receivable accounting system 194 is linked to the invoice accounting system 198.

The invoice accounting system 198 of the first business 190 generates electronic invoice information, which is the bill data 124 provided to the parse module 126 in the combined bill management system 70. The payroll accounting system 200 of the first business 190 provides the business payroll information 120 to the operational cash flow projection module 116 in the combined bill management system 70. The operational cash flow projection module 116 provides the cash flow information 122 as an output of the combined bill management system 70 to the first business 190. As mentioned above, the payment processing module 114 provides the payment credit information 157 and the payment debit information 175 to the first business 190. The CSP function module 112 in the combined bill management system 70 provides the electronic bill 170 to the accounts payable accounting system 196 in the first business 190.

The accounts payable accounting system 196 in the first business 190 provides the electronic payment order signal 172 to the CSP function module 112 in the combined bill management system 70. The payment processing module 114 in the combined bill management system 70 provides the payment credit 156 to the first business bank 192. The first business bank 192 provides the business bank account information 118 to the operational cash flow projection module 116 in the combined bill management system 70. The payment processing module 114 in the combined bill management system 70 provides the payment credit 174 to the first business bank 192.

Also illustrated in FIG. 4 is a first customer 202 having a first customer bank 204. Optionally, the first customer 202 may use a CSP ("customer service provider") 206 to provide the first customer 202 with bill presentment and payment services. If the first customer 202 also subscribes to the business combined bill management system of the present invention, the function of the CSP 206 may be performed by the CSP function module 112. Finally, also shown in FIG. 4 is a first vendor 208 having a first vendor bank 210. Optionally, the first vendor 208 may use a BSP ("biller service provider") 212 to provide the first vendor 208 with bill presentment services. If the first vendor 208 also subscribes to the business combined bill management system of the present invention, the function of the BSP 212 may be performed by the BSP function module 110.

The BSP function module 110 in the combined bill management system 70 provides the electronic bills 134 either directly to the first customer 202, or alternately to the CSP 206 if the first customer 202 uses the CSP 206. If the CSP 206 is used, then the CSP 206 provides electronic bills to the first customer 202. If a third party payment processor is used in conjunction with the CSP 206, the CSP 206 sends the third party electronic payment signal 142 to the electronic lock box 144 in the combined bill management system 70. If a third party payment processor is used without a CSP 206, the first customer 202 sends the third party electronic payment signal 142 to the electronic lock box 144.

If neither a third party payment processor nor a CSP 206 is used, the first customer 202 sends the electronic payment initiation signal 140 directly to the BSP function module 110 in the combined bill management system 70. The BSP function module 110 forwards the payment instruction to the payment processing module 114. If a third party payment processor is not used but there is a CSP 206, the first customer 202 initiates payment with the CSP 206, which then sends the electronic payment initiation signal 140 to the BSP function module 110. The payment processing module 114 in the combined bill management system 70 sends the payment debit 154 to the first customer bank 204.

The payment processing module 114 also sends the payment debit information 175 to the first vendor bank 210. If the first vendor 208 does not have a BSP 212, then the first vendor 208 sends the bill data 160 directly to the parse module 162 in the combined bill management system 70. If the first vendor 208 has a BSP 212, then the first vendor 208 sends billing data to the BSP 212, which then sends the third party bill data 158 to the CSP function module 112 in the combined bill management system 70.

Figure 5:
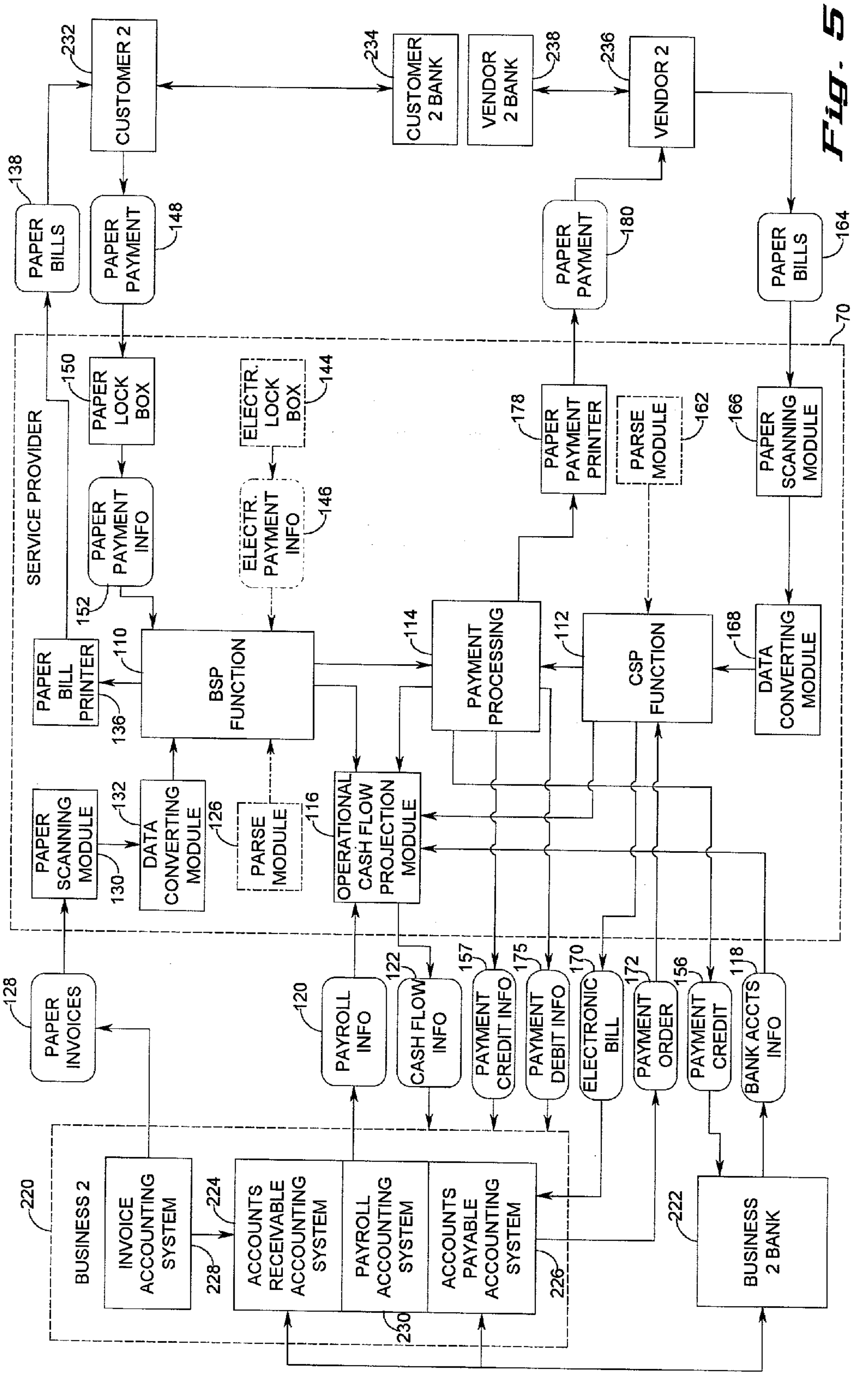
FIG. 5 is a functional schematic diagram showing the combined bill management system illustrated in FIG. 3 with a second business and two of its customers and two of its vendors, and their respective financial institutions.

Moving now to FIG. 5, the combined bill management system 70 of FIG. 3 is illustrated in a configuration to serve a second business 220 having a second business bank 222. The second business 220 includes an accounts receivable accounting system 224, an accounts payable accounting system 226, an invoice accounting system 228, and a payroll accounting system 230. The accounts receivable accounting system 224, the accounts payable accounting system 226, and the payroll accounting system 230 are linked together and to the second business bank 222, and the accounts receivable accounting system 224 is linked to the invoice accounting system 228.

The invoice accounting system 228 of the second business 220 generates paper invoices 128 which are provided to the paper scanning module 130 in the combined bill management system 70. The payroll accounting system 230 of the second business 220 provides the business payroll information 120 to the operational cash flow projection module 116 in the combined bill management system 70. The operational cash flow projection module 116 provides the cash flow information 122 as an output of the combined bill management system 70 to the second business 220. As mentioned above, the payment processing module 114 provides the payment credit information 157 and the payment debit information 175 to the first business 190. The CSP function module 112 in the combined bill management system 70 provides the electronic bill 170 to the accounts payable accounting system 226 in the second business 220.

The accounts payable accounting system 226 in the second business 220 provides the electronic payment order signal 172 to the CSP function module 112 in the combined bill management system 70. The payment processing module 114 in the combined bill management system 70 provides the payment credit 156 to the second business bank 222. The second business bank 222 provides the business bank account information 118 to the operational cash flow projection module 116 in the combined bill management system 70.

Also illustrated in FIG. 5 is a second customer 232 having a second customer bank 234. Finally, also shown in FIG. 5 is a second vendor 236 having a second vendor bank 238. The paper bill printer module 136 in the combined bill management system 70 provides the paper bills 138 to the second customer 232. The second customer 232 sends the paper payment 148 to the paper lock box 150 in the combined bill management system 70.

The paper payment printer 178 in the paper payment printer 178 prints and sends the paper payment 180 to the second vendor 236. The second vendor sends the paper bills 164 to the paper scanning module 166 in the combined bill management system 70.

Referring next to FIG. 6 (which parallels FIG. 4), the process by which a first business bills a first customer and the first customer pays the bill is shown. The first business generates electronic invoice information, and the first customer accepts electronic bills and makes electronic payments, and may optionally use a CSP ("customer service provider") and/or third party electronic payment. In a send electronic billing data step 240, the first business sends the bill data to the parse module. Next, in a parse bill data step 242, the parse module parses the bill data to extract the desired information, which is supplied to the BSP function module of the business combined bill management system of the present invention.

In a determine capability of receiving electronic bills step 244, the BSP function module confirms whether the first customer can receive electronic bills, making an affirmative determination. (Note that in the example contemplated in FIG. 6, the customer can in fact receive electronic bills; accordingly, the determine capability of receiving electronic bills step 244 is not shown as having more than one outcome.) Next, in a check for CSP determination step 246, the BSP checks to determine whether or not the first customer has a CSP.

If the first customer does not have a CSP, the BSP function e-mails notices to the first customer whenever a bill is received, as shown in a BSP e-mails notice of bill availability step 247. Optionally, the BSP function could also send notices that multiple bills have been received and/or have not been reviewed. The first customer may then request the bill from the BSP function in a customer requests bill from BSP step 248. This is typically accomplished using a web link which allows the first customer to access a page at a secure site hosted by the BSP function which displays the bill in full (including marketing messages inserted by the first business) by clicking on the link, as shown in a detailed bill is provided to customer step 249. (Note that in some instances only summary billing information may be available, such as for example in the case where the detailed billing information is not made available on an online basis.)

Next, the first customer approves the bill for payment in an approve payment step 250, following which the process moves to a third party BPP determination step 252. If the first customer uses a third party BPP ("bill payment provider"), the process moves to a third party BPP payment step 254 in which the third party BPP initiates payment of the bill and sends a notice confirming the initiation of payment to the BSP function module. Returning again to the third party BPP determination step 252, if, on the other hand, the first customer does not use a third party BPP, the process moves instead to a send electronic payment step 256 in which an electronic payment initiation is sent to the BSP ("biller service provider") function module.

Next, the BSP function module sends a signal to the payment processing module to initiate the payment process in a send payment initiation signal step 258. The payment processing module then sends a payment debit to the first customer bank to debit the first customer's account in a send payment debit step 260. Finally, the payment processing module sends a payment credit to the first business bank to credit the first business's account in a send payment credit step 262.

Returning to the check for CSP determination step 246, if, on the other hand, the first customer does have a CSP, the BSP function module sends bill summary information to that CSP in a send bill summary to customer CSP step 263. The first customer's CSP e-mails notices to the first customer whenever a bill is received, as shown in a CSP e-mails notice of bill availability step 264. The CSP function may also be capable of sending notices that multiple bills have been received and/or have not been reviewed. The first customer may then request summary bill information from the CSP function in a customer requests bill from CSP step 265. This is typically accomplished using a web link which allows the first customer to access a page at a secure site hosted by the first customer's CSP which displays one or more bill in summary form by clicking on the link, as shown in a summary bill is provided to customer step 265.

In a request of bill detail determination step 267, the first customer can either approve a bill for payment based upon the summary bill information, or alternately request detailed information on a bill. If the first customer elects to approve the bill for payment without reviewing detailed bill information, the process moves immediately to an approve payment step 268. If, on the other hand, the first customer requests additional bill detail (which is generally retained by the BSP function rather than being provided to the first customer's CSP), that information will be provided to the first customer by the ESP function. This is typically accomplished using a web link which allows the first customer to access a page at a secure site hosted by the BSP function which displays the bill in full (including marketing messages inserted by the first business) by clicking on the link, as shown in a BSP sends bill detail to customer step 269. The first customer may then elect to pay the bill, and the process will moves to the approve payment step 268, following which it moves to a third party BPP determination step 270.

If the first customer's CSP uses a third party BPP, the process moves to a third party BPP payment step 254 in which the third party BPP initiates payment of the bill and sends a notice confirming the initiation of payment to the BSP function module. Returning again to the third party BPP determination step 270, if, on the other hand, the first customer does not use a third party BPP, the process moves instead to a send electronic payment step 272 in which an electronic payment initiation is sent to the BSP function module by the first customer's CSP.

Next, the BSP function module sends a signal to the payment processing module to initiate the payment process in the send payment initiation signal step 258. The payment processing module then sends a payment debit to the first customer bank to debit the first customer's account in the send payment debit information step 260. Optionally, the payment processing module may also send payment debit information to the first customer. Finally, the payment processing module sends a payment credit to the first business bank to credit the first customer's account in the send payment credit information step 262. Optionally, the payment processing module may also send payment credit information to the first business. This completes the process by which a first business bills a first customer and the first customer pays the bill.

Moving now to FIG. 7, (which also parallels FIG. 4), the process by which a first vendor bills the first business and the first business pays the bill is shown. The first vendor generates electronic bill data, either directly or optionally through the use of a BSP (biller service provider"), and the first business accepts electronic bills and makes electronic payments. The process starts in one of two different places, depending upon whether or not the first vendor has a BSP, as illustrated in FIG. 7 in a vendor BSP determination step 280. Note that in the actual process, there is no requirement for such a determination, because vendors will fall into one category or the other.

If the first vendor does not have a BSP, the process begins in a send bill data to system step 282 in which the first vendor sends electronic bill data to the parse module. Next, in a parse bill data step 284, the parse module parses the bill data to extract the desired information, which is supplied to the CSP function module of the business combined bill management system of the present invention. If, on the other hand, the first vendor has a BSP, the first vendor provides electronic bill data to its BSP in a send bill data to BSP step 286. Alternatively, the bill information may be "scraped" from the BSP using known screen scraping techniques. The first vendor's BSP then sends the electronic bill data to the CSP function module in a send bill data to system step 288.

The CSP function module then presents the electronic bill (which may be summary or more detailed bill information depending on what information has been obtained by the CSP function) directly to the first business in a send bill to business step 290. If the CSP function has only summary bill information or initially sends only summary bill information, the bill detail may be obtained from the CSP function, from the first vendor's BSP, or from the first vendor as appropriate. Next, the first business approves the bill for payment in an approve payment step 292. The process then moves to a send electronic payment step 294 in which an electronic payment initiation signal is sent to the CSP function module.

Next, the CSP function module sends a signal to the payment processing module to initiate the payment process in a send payment initiation signal step 296. The payment processing module then sends a payment debit to the first business bank to debit the first business's account in a send payment debit information step 298. Optionally, the payment processing module may also send payment debit information to the first business. Finally, the payment processing module sends a payment credit to the first vendor bank to credit the first vendor's account in a send payment credit information step 300. Optionally, the payment processing module may also send payment credit information to the first vendor. This completes the process by which a first vendor bills the first business and the first business pays the bill.

Turning next to FIG. 8 (which parallels FIG. 4), the process by which a second business bills a second customer and the second customer pays the bill is shown. The second business generates paper invoices, and the second customer accepts paper invoices and makes paper payments. In a send paper invoices step 310, the second business sends the paper invoices to the paper scanning module. Next, in a paper scanning step 312, the paper scanning module scans the paper invoices and produces scanned data as an output. The scanned data is supplied to the data converting module, and in a scanned data conversion step 314 the scanned data is converted into bill data including the desired information, which bill data is sent to the BSP function module of the business combined bill management system of the present invention.

In a determine capability of receiving electronic bills step 316, the BSP function module confirms that the second customer cannot receive electronic bills. (Note that in the example contemplated in FIG. 8, the customer cannot in fact receive electronic bills; accordingly, the determine capability of receiving electronic bills step 316 is not shown as having more than one outcome.) The BSP module initiates printing of paper bills in an initiate printing of paper bills step 318, following which the paper bills are printed for the second customer in a print paper bill step 320, and then mailed (typically by regular postal service) to the second customer in a send paper bill step 322.

The second customer then prepares and sends a paper payment (such as a check) in a send paper payment step 324, with the paper payment being received by a paper lock box in a receive paper payment step 326. The paper payment (information contained in which typically includes at least an account number for the second customer, the amount being paid, and the second customer's bank account information) is processed through conventional paper check clearing processes. The paper lockbox sends payment credit information to the BSP function module.

Figure 9:
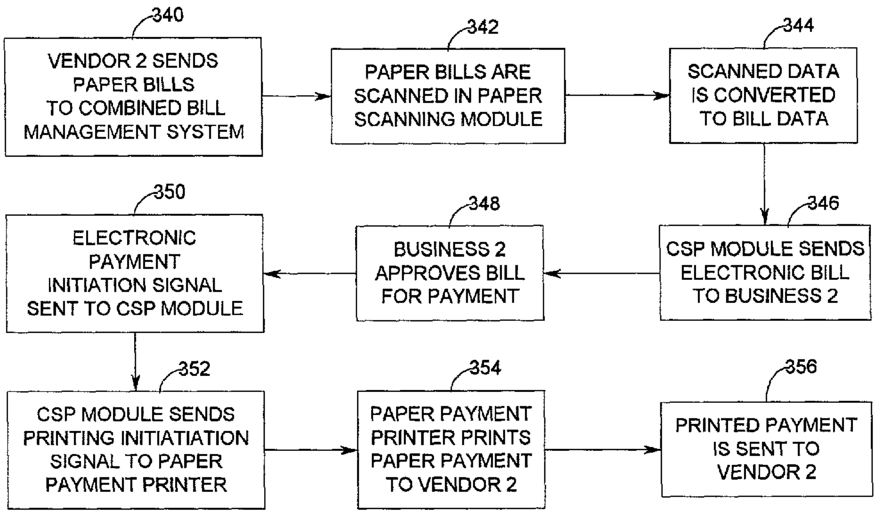
FIG. 9 is a flow diagram illustrating the process by which the combined bill management system illustrated in FIGS. 2 through 5 facilitates the receipt of billing information from a vendor generating paper bills to a business and the paper payment of the bills from the vendor.

Turning now to FIG. 9 (which also parallels FIG. 5), the process by which a second vendor bills the second business and the second business pays the bill is shown. The second vendor generates paper bills, and the second business accepts electronic bills and makes paper payments to the second vendor, which does not accept electronic payments. The process starts with a send paper bills step 340 in which the second vendor sends a paper bill to the paper scanning module of the combined bill management system of the present invention. In a paper bill scanning step 342, the paper scanning module scans the paper bill and produces scanned data as an output. The scanned data is supplied to the data converting module, and in a scanned data conversion step 344 the scanned data is converted into bill data including the desired information, which bill data is sent to the CSP function module of the business combined bill management system of the present invention.

The CSP function module then presents the electronic bill (which may be summary or more detailed bill information depending on what information has been obtained by the CSP function) directly to the second business in a send bill to business step 346. Next, the second business approves the bill for payment in an approve payment step 348, and then sends an electronic payment initiation signal to the CSP function module in an initiate payment step 350.

The CSP function module then sends a payment printing initiation signal to the paper payment printer in a send printing initiation signal step 352. The paper payment printer will then print a paper payment (typically a check) to the second vendor in a print paper payment step 354. This paper payment is then sent to the second vendor in a send printed payment step 356, and it is deposited by the second vendor following receipt and payment is made as is conventional.

Figure 10:
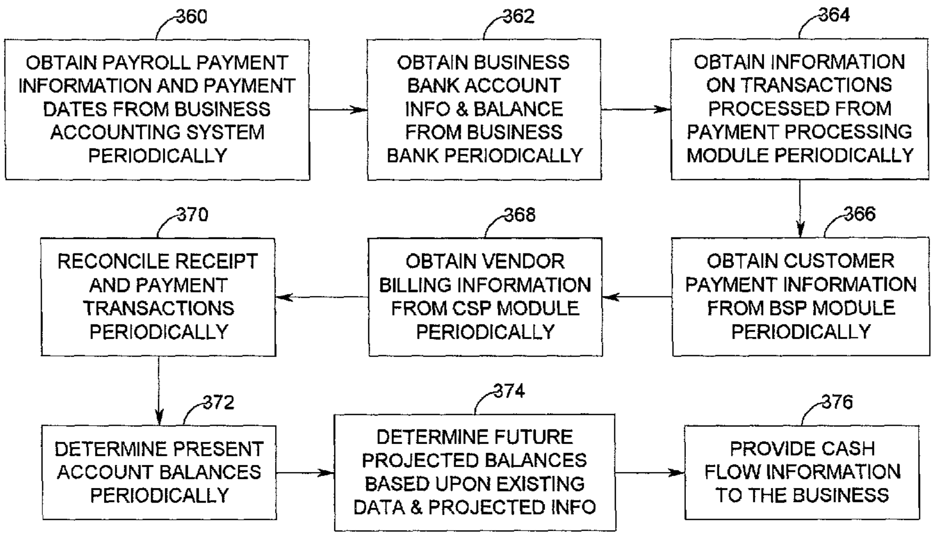
FIG. 10 is a flow diagram illustrating the process by which the operational cash flow projection of the combined bill management system illustrated in FIGS. 2 through 5 operates to provide calculated and projected financial data to the business.

Referring next to FIG. 10, an exemplary process which may be used by the operational cash flow projection module (illustrated as 116 in FIG. 3) to provide information to businesses served by the business combined bill management system of the present invention is shown. The first five steps of the process used by the operational cash flow projection module are information gathering steps, and they are followed by three calculation steps, with the process culminating in the provision of information including operational cash flow projections to the businesses served by the business combined bill management system. Note that the order of the five information gathering steps is inconsequential.

The operational cash flow projection module obtains payroll information and payment dates for payrolls occurring in the future from the businesses' payroll accounting systems periodically in an obtain payroll information step 360. Typically, this information is obtained on a less frequent basis, since payrolls are typically paid on a twice monthly basis. Calculations can be done by the operational cash flow projection module based on a stable payroll for periods of time well into the future. It will be appreciated by those skilled in the art that the information gathered in the obtain payroll information step 360 is financial information which relates to the future financial position of a business. In a similar manner, information about other payments and receipts that are not related to invoices to customers or bills from vendors can be gathered.

The process next moves to an obtain bank account information step 362 in which the operational cash flow projection module obtains information about the current balances of all of the bank accounts and other financial holdings of the businesses. This information is obtained more frequently, for example at least once each business day. While in FIGS. 4 and 5 only information from a single bank is illustrated as being collected, it will be appreciated by those skilled in the art that financial information can easily be collected from all of the various sources in which the businesses have financial holdings. It will also be appreciated that the information gathered in the obtain bank account information step 362 is of transactions which have been processed and is thus present rather than future financial information.

The next step is an obtain processed payment information step 364 in which the operational cash flow projection module obtains information from the payment processing module (illustrated as 114 in FIG. 3) about transactions which have been processed for payment by the payment processing module. This information is obtained on an ongoing basis. While these transactions will not yet be reflected in the balances of the businesses' banks, they reflect future transactions which will occur in the near future. Thus, it will be appreciated that the information gathered in the obtain processed payment information step 364 is future rather than present financial information.

The process next moves to an obtain customer payment information step 366 in which the operational cash flow projection module obtains information from the BSP module (illustrated as 110 in FIG. 3) about regarding payments which have been made or scheduled by customers. This information is obtained on an ongoing basis, and can relate to payments made by independent CSP's or by third party bill payment services, as well as information regarding payment which will be handled shortly by the payment processing module of the business combined bill management system. It will thus be appreciated that the information gathered in the obtain customer payment information step 366 is future rather than present financial information.

The next step in the process is an obtain vendor billing information step 368 in which the operational cash flow projection module obtains information from the CSP module (illustrated as 112 in FIG. 3) about payments which are being made or have been scheduled to be made to vendors. This information is obtained on an ongoing basis, and relates to payments which have been initiated but have not yet cleared, which payments which will be handled shortly by the payment processing module of the business combined bill management system. Thus, it will be appreciated that the information gathered in the obtain vendor billing information step 368 is future rather than present financial information.

The process moves next to a reconcile receipt and payment transaction step 370 in which the operational cash flow projection module reconciles receipt information received from the BSP function module and payment information received from the CSP function module with information received from the payment processing module and bank account information. This process occurs with the same frequency as the obtaining of information from the bank accounts affected by the receipts and payments.

The operational cash flow projection module determines the calculated balances of all financial accounts based upon executed payment information received in the preceding steps in a balance calculation step 372. It also determines future projected balances based upon anticipated payment information received in the preceding steps in a determine future projected balance information step 374, with the calculations showing the projected fluctuation of balances over a significant future period which may range from days to weeks or more. Finally, the calculated and projected cash flow information is provided to the businesses served by the business combined bill management system of the present invention in a provide cash flow information step 376.

Figure 11:
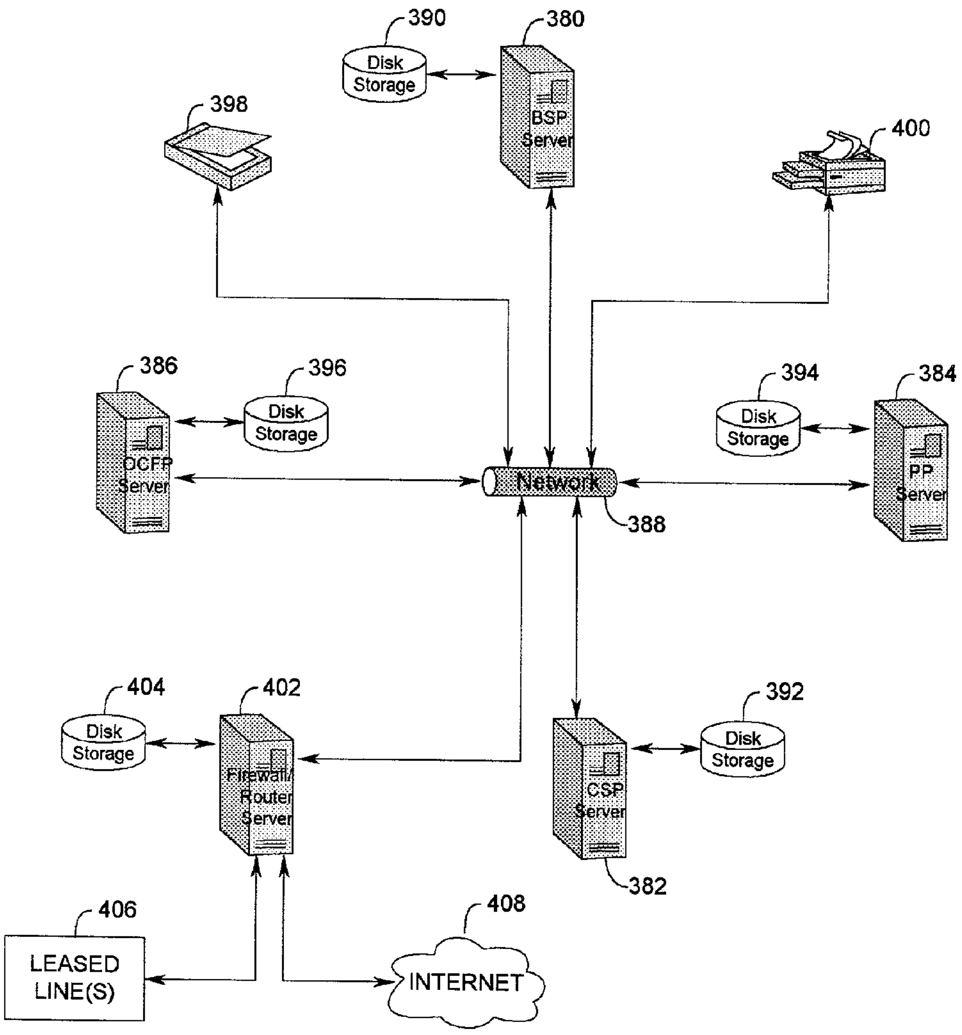
FIG. 11 is a functional schematic diagram of a first implementation of the combined bill management system of the present invention which is implemented using a plurality of servers, each of which servers performs a dedicated function in the system.

Turing next to FIG. 11, and with reference again to FIG. 3, an exemplary depiction of one possible hardware implementation of the business combined bill management system of the present invention which uses discrete servers for each primary function is illustrated. A BSP server 380 is used to provide the function of the BSP function module 110, a CSP server 382 is used to provide the function of the CSP function module 112, a PP server 384 is used to provide the function of the payment processing module 114, and an OCFP server 386 is used to provide the function of the operational cash flow projection module 116. All four of the servers 380, 382, 384, and 386 are linked together by a network connection 388.

Each of the servers 380, 382, 384, and 386 is connected to a disk storage device, as designated by the reference numbers 390, 392, 394, and 396, respectively. A scanner 398 is also connected to the network connection 388, and may serve to provide the functions of both the paper scanning module 130 and the paper scanning module 166. Alternately, two scanners could instead be used. A printer 400 is also connected to the network connection 388, and may serve to provide the functions of both the paper bill printer module 136 and the paper payment printer 178. Alternately, two printers could be used instead.

A firewall/router server 402 having a disk storage device 404 connected thereto is also connected to the network connection 388. The firewall/router server 402 is connected to one or more leased lines 406, which may link the business combined bill management system of the present invention with various businesses (none of which are shown in FIG. 11). The firewall/router server 402 is also connected to the Internet 408, through which the business combined bill management system of the present invention may be connected to customers and vendors (the Internet 408 may also be a connection medium for one or more of the businesses described above as being connected through leased lines 406).

Figure 12:
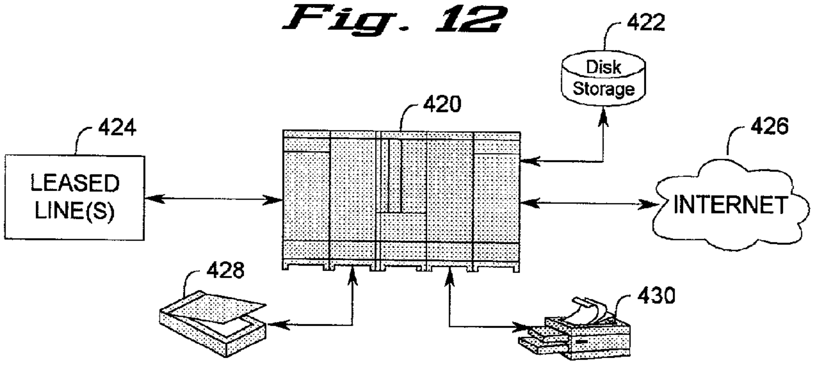
FIG. 12 is a functional schematic diagram of an alternate implementation of the combined bill management system of the present invention which is implemented using a single computer instead of the discrete servers used in the first implementation illustrated in FIG. 11.

Moving finally to FIG. 12, another exemplary depiction of a possible hardware implementation of the business combined bill management system of the present invention which uses a single computer 420 for all functions is illustrated. The computer 420 is connected to a disc storage device 422, to one or more leased lines 424, and to the Internet 426. A scanner 428 and a printer 430 are also connected to the computer 420. The computer 420 thus performs the functions of all five of the servers 380, 382, 384, 386, and 402 illustrated in FIG. 11, and may itself be a mainframe, for example.

In another embellishment, the business combined bill management system of the present invention may be provided by a service provider on behalf of any number of different companies. In this event, the business combined bill management system of the present invention would be operated by the service provider and branded with the name of businesses on behalf of which the service provider was providing the bill management service. For example, consider the situation where the third party provider operates the business combined bill management system on behalf of one or more banks, which in turn market the service to their customers.

In this regard, if the business combined bill management system is being provided as a branded product on behalf of one or more banks, a natural extension would be the provision of screen flow hooks into an on-line banking system. Such a system would move seamlessly between the two (or more) applications, without the necessity to have passwords entered to log onto the other secure system after the initial logon to the bank's secure website, or to one of the parts thereof. This feature may be referred to as seamless login, and includes seamless enrollment to all the other systems once the user has enrolled in any one of the systems.

It may therefore be appreciated from the above detailed description of the preferred embodiment of the present invention that it teaches an integrated, combined bill management system for use by businesses which interfaces with both customers and vendors of the businesses. The business combined bill management system enables the presentation of invoices to customers of the businesses, and it further facilitates payment by the customers. The business combined bill management system of the present invention enables the obtaining of bills from the vendors and it presents these bills electronically to the businesses and facilitates their electronic payment by the businesses.

The business combined bill management system of the present invention is capable of accepting any form of customer invoicing information from businesses, including either paper or electronic invoice information. The business combined bill management system is capable of supplying either electronic or paper invoices to customers, irrespective of the form of invoice originally generated and provided by the businesses. The business combined bill management system of the present invention is capable of accepting either paper or electronic payment from customers irrespective of the form in which the invoice was sent to the customers.

The business combined bill management system of the present invention is capable of accepting either paper or electronic bills from vendors, while providing electronic bills to the businesses for review and payment. The business combined bill management system in its preferred embodiment also can advantageously present an operational cash flow management capability to enable the businesses it serves to understand both their present and anticipated future cash flow position. The business combined bill management system of the present invention is capable of simultaneously serving a plurality of businesses, each of which has both multiple customers and multiple vendors.

The business combined bill management system of the present invention operates in a manner which is both secure and effective, and it requires little or no effort or special training for the employees of businesses which use it to handle their invoicing of and collection from customers, and review and payment of bills from their vendors. The business combined bill management system of the present invention is also economically efficient by virtue of its integrated design to minimize its cost and thereby afford it the broadest possible market. Finally, all of the aforesaid advantages and objectives of the business combined bill management system of the present invention are achieved without incurring any substantial relative disadvantage.

Although an exemplary embodiment of the business combined bill management system of the present invention has been shown and described with reference to particular embodiments and applications thereof, it will be apparent to those having ordinary skill in the art that a number of changes, modifications, or alterations to the invention as described herein may be made, none of which depart from the spirit or scope of the present invention. All such changes, modifications, and alterations should therefore be seen as being within the scope of the present invention.

What is claimed is:

1. A method of managing bills by a system comprising:

obtaining, via one or more servers, at least one set of customer billing information from at least one business, wherein the at least one set of customer billing information includes:

customer invoice information including at least an amount owed to the at least one business by a customer; and customer preference information indicating how a customer bill is to be received;

determining, via the one or more servers, a first format for the at least one set of obtained customer billing information, the first format being one of an electronic format, a paper format, or a combination of electronic format and paper format;

converting, via the one or more servers, the customer invoice information associated with the at least one set of obtained customer billing information into a second format based on the customer preference information;

sending to the customer, via the one or more servers, the customer bill in the second format, the customer bill including the customer invoice information;

accepting, via the one or more servers, payment information from the customer, the payment information being in one of an electronic format, a paper format, or a combination of electronic format and paper format;

obtaining, via the one or more servers, at least one set of vendor billing information from at least one vendor of the at least one business, wherein the at least one set of vendor billing information includes:

vendor invoice information including at least an amount owed to the at least one vendor by the at least one business; and vendor preference information indicating how a vendor bill is to be received by the at least one vendor;

determining, via the one or more servers, a first vendor format for the at least one set of obtained vendor billing information, wherein the first vendor format is one of an electronic format, a paper format, or a combination of electronic format or paper format;

converting, via the one or more servers, the vendor invoice information associated with the at least one set of obtained vendor billing information into a second vendor format based on the vendor preference information;

sending to the at least one vendor, via the one or more servers, the vendor bill in the second format, wherein the vendor bill includes the vendor invoice information associated with the vendor;

accepting, via the one or more servers, payment information from the at least one vendor, the payment information being in one of an electronic format, a paper format, or a combination of electronic format and paper format;

acquiring, via the one or more servers, financial information relating to a plurality of categories, the plurality of categories including invoiced amounts and bills paid for the at least one business, bank accounts associated with the at least one business, and present and future payroll of the at least one business;

determining, via the one or more servers, cash flow information relating to present and anticipated future cash flow positions of the at least one business based upon the financial information relating to at least two of the plurality of categories; and supplying, via the one or more servers, the at least one business with the determined cash flow information.

2. The method of claim 1, wherein at least a portion of the customer billing information is in the form of a print stream.

3. The method of claim 1, wherein at least a portion of the customer billing information is obtained by screen scraping.

4. The method of claim 1, wherein the customer bill is sent electronically.

5. The method of claim 4, wherein the customer bill is presented electronically directly to customers or via a CSP ("Customer Service Provider").

6. The method of claim 1, wherein the paper format comprises paper bills and wherein the customer bill is sent by mailing the customer bill to the customer.

7. The method of claim 1, wherein the payment information comprises:

information identifying the customer; and a payment instrument.

8. The method of claim 1, wherein the payment information comprises:

electronic information identifying the customer; and electronic payment information relating to a transfer of funds from an account associated with the customer to an account associated with one of the businesses.

9. The method of claim 1, wherein the payment information comprises:

electronic information identifying the customer; and electronic payment information regarding a transfer of funds by a third party payment provider from an account associated with the customer to an account associated with one or more of the at least one business.

10. The method of claim 1, wherein obtaining the at least one set of vendor billing information comprises:

acquiring vendor billing information from the at least one vendor of the business; and extracting vendor billing data from the vendor billing information, the extracted vendor billing data being in electronic form.

11. The method of claim 10, wherein at least a portion of the acquired vendor billing information is in electronic form.

12. The method of claim 10, wherein at least a portion of the acquired vendor billing information is in the form of paper bills, wherein the second vendor format is an electronic format, and wherein the converting comprises:

scanning the paper bills to produce scanned paper bill data; and identifying and converting information contained in the scanned paper bill data into the vendor billing data.

13. The method of claim 1, wherein vendor bills are sent electronically.

14. The method of claim 1, wherein the payment information is received electronically.

15. The method of claim 1, further comprising:

branding the customer bill with information identifying an entity.

16. The method of claim 1, further comprising:

combining a message with the customer bill, and sending the message and the customer bill to the customer.

17. The method of claim 7, wherein the payment instrument comprises a check.

18. A system for managing bills comprising:

a processor; and a memory communicatively coupled to the processor, the memory storing instructions which, when executed on the processor, perform a method, the method comprising:

obtaining at least one set of customer billing information from at least one business, wherein the at least one set of customer billing information includes:

customer invoice information including at least an amount owed to the at least one business by a customer; and customer preference information indicating how a customer bill is to be received;

determining a first format for the at least one set of obtained customer billing information, the first format being one of an electronic format, a paper format, or a combination of electronic format and paper format;

converting the customer invoice information associated with the at least one set of obtained customer billing information into a second format based on the customer preference information;

sending to the customer the customer bill in the second format, the customer bill including the customer invoice information;

accepting payment information from the customer, the payment information being in one of an electronic format, a paper format, or a combination of electronic format and paper format;

obtaining at least one set of vendor billing information from at least one vendor of the at least one business, wherein the at least one set of vendor billing information includes:

vendor invoice information including at least an amount owed to the at least one vendor by the at least one business; and vendor preference information indicating how a vendor bill is to be received by the at least one vendor;

determining a first vendor format for the at least one set of obtained vendor billing information, wherein the first vendor format is one of an electronic format, a paper format, or a combination of electronic format or paper format;

converting the vendor invoice information associated with the at least one set of obtained vendor billing information into a second vendor format based on the vendor preference information;

sending to the at least one vendor the vendor bill in the second format, wherein the vendor bill includes the vendor invoice information associated with the vendor;

accepting payment information from the at least one vendor, the payment information being in one of an electronic format, a paper format, or a combination of electronic format and paper format;

acquiring financial information relating to a plurality of categories, the plurality of categories including invoiced amounts and bills paid for the at least one business, bank accounts associated with the at least one business, and present and future payroll of the at least one business;

determining cash flow information relating to present and anticipated future cash flow positions of the at least one business based upon the financial information relating to at least two of the plurality of categories; and supplying the at least one business with the determined cash flow information.

19. A non-transitory computer-readable storage medium encoded with instructions which, when executed on a processor, perform a method, the method comprising:

obtaining at least one set of customer billing information from at least one business, wherein the at least one set of customer billing information includes:

customer invoice information including at least an amount owed to the at least one business by a customer; and customer preference information indicating how a customer bill is to be received;

determining a first format for the at least one set of obtained customer billing information, the first format being one of an electronic format, a paper format, or a combination of electronic format and paper format;

converting the customer invoice information associated with the at least one set of obtained customer billing information into a second format based on the customer preference information;

sending to the customer the customer bill in the second format, the customer bill including the customer invoice information;

accepting payment information from the customer, the payment information being in one of an electronic format, a paper format, or a combination of electronic format and paper format;

obtaining at least one set of vendor billing information from at least one vendor of the at least one business, wherein the at least one set of vendor billing information includes:

vendor invoice information including at least an amount owed to the at least one vendor by the at least one business; and vendor preference information indicating how a vendor bill is to be received by the at least one vendor;

determining a first vendor format for the at least one set of obtained vendor billing information, wherein the first vendor format is one of an electronic format, a paper format, or a combination of electronic format or paper format;

converting the vendor invoice information associated with the at least one set of obtained vendor billing information into a second vendor format based on the vendor preference information;

sending to the at least one vendor the vendor bill in the second format, wherein the vendor bill includes the vendor invoice information associated with the vendor;

accepting payment information from the at least one vendor, the payment information being in one of an electronic format, a paper format, or a combination of electronic format and paper format;

acquiring financial information relating to a plurality of categories, the plurality of categories including invoiced amounts and bills paid for the at least one business, bank accounts associated with the at least one business, and present and future payroll of the at least one business;

determining cash flow information relating to present and anticipated future cash flow positions of the at least one business based upon the financial information relating to at least two of the plurality of categories; and supplying the at least one business with the determined cash flow information.

* * * * *